(12) United States Patent
Kusama et al.

(10) Patent No.: US 11,462,730 B2
(45) Date of Patent: Oct. 4, 2022

(54) ELECTRODE, SECONDARY BATTERY, BATTERY PACK, AND VEHICLE

(71) Applicant: KABUSHIKI KAISHA TOSHIBA, Minato-ku (JP)

(72) Inventors: Tomoe Kusama, Tokyo (JP); Tetsuya Sasakawa, Yokohama (JP); Kazuomi Yoshima, Yokohama (JP); Tomoko Sugizaki, Kawasaki (JP); Wen Zhang, Sagamihara (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 274 days.

(21) Appl. No.: 16/804,425

(22) Filed: Feb. 28, 2020

(65) Prior Publication Data

US 2021/0083269 A1 Mar. 18, 2021

(30) Foreign Application Priority Data

Sep. 13, 2019 (JP) .............................. JP2019-167418

(51) Int. Cl.
*H01M 4/36* (2006.01)
*H01M 4/505* (2010.01)
(Continued)

(52) U.S. Cl.
CPC ........... *H01M 4/362* (2013.01); *H01M 4/505* (2013.01); *H01M 4/525* (2013.01); *H01M 4/625* (2013.01);
(Continued)

(58) Field of Classification Search
CPC ........... H01M 10/0525; H01M 10/054; H01M 10/056; H01M 10/0562; H01M 10/425;
(Continued)

(56) References Cited

U.S. PATENT DOCUMENTS

2006/0188784 A1  8/2006  Sudoh et al.
2007/0020241 A1  8/2007  Takeuchi et al.
(Continued)

FOREIGN PATENT DOCUMENTS

JP  2004-186075 A  7/2004
JP  3930002 B2  6/2007
(Continued)

*Primary Examiner* — Victoria H Lynch
(74) *Attorney, Agent, or Firm* — Oblon, McClelland, Maier & Neustadt, L.L.P.

(57) ABSTRACT

According to one embodiment, an electrode is provided. The active material-containing layer includes an active material, inorganic solid particles having lithium ion conductivity, and carbon fiber. A pore diameter $D_M$ at the first peak is 0.05 μm to 10 μm. A value SA−SB is 1.4 or more in a slope distribution curve of the active material-containing layer, where a vertical axis of the slope distribution curve represents a slope of a straight line passing through two adjacent measurement points on the log differential pore volume distribution curve and a horizontal axis of the slope distribution curve represents a smaller pore diameter of the two adjacent measurement points. The value SA−SB is obtained by subtracting a minimum slope value SB from a maximum slope value SA.

17 Claims, 9 Drawing Sheets

(51) Int. Cl.
  *H01M 4/525*  (2010.01)
  *H01M 4/62*   (2006.01)
  *H01M 10/0525* (2010.01)
  *H01M 10/42*  (2006.01)
  *H01M 4/02*   (2006.01)

(52) U.S. Cl.
  CPC ..... *H01M 10/0525* (2013.01); *H01M 10/425* (2013.01); *H01M 2004/021* (2013.01); *H01M 2010/4271* (2013.01); *H01M 2220/20* (2013.01)

(58) Field of Classification Search
  CPC ..... H01M 2004/021; H01M 2004/027; H01M 2004/028; H01M 2010/4271; H01M 2220/20; H01M 4/131; H01M 4/1391; H01M 4/362; H01M 4/382; H01M 4/485; H01M 4/50; H01M 4/505; H01M 4/52; H01M 4/525; H01M 4/62; H01M 4/625; Y02E 60/10
  See application file for complete search history.

(56) References Cited

U.S. PATENT DOCUMENTS

| | | | |
|---|---|---|---|
| 2007/0231690 A1* | 10/2007 | Fujita | H01M 10/0525 |
| | | | 429/209 |
| 2014/0099538 A1 | 4/2014 | Johnson et al. | |
| 2016/0276652 A1 | 9/2016 | Iwasaki et al. | |
| 2019/0013542 A1 | 1/2019 | Otaki et al. | |
| 2019/0157723 A1 | 5/2019 | Suzuki et al. | |
| 2019/0214629 A1 | 7/2019 | Andre et al. | |

FOREIGN PATENT DOCUMENTS

| | | |
|---|---|---|
| JP | 4031009 B2 | 1/2008 |
| JP | 4798750 B2 | 10/2011 |
| JP | 6193285 B2 | 9/2017 |

* cited by examiner

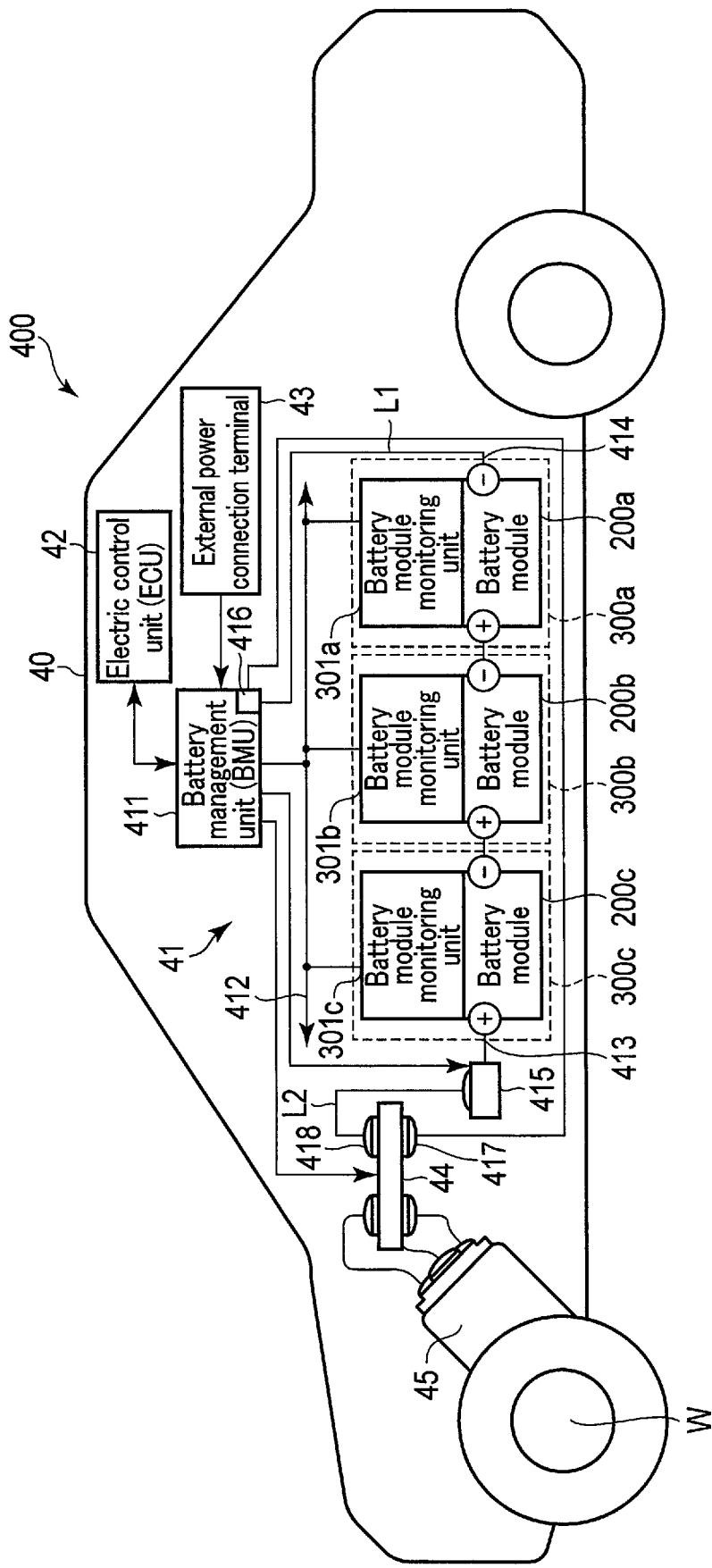
F I G. 12

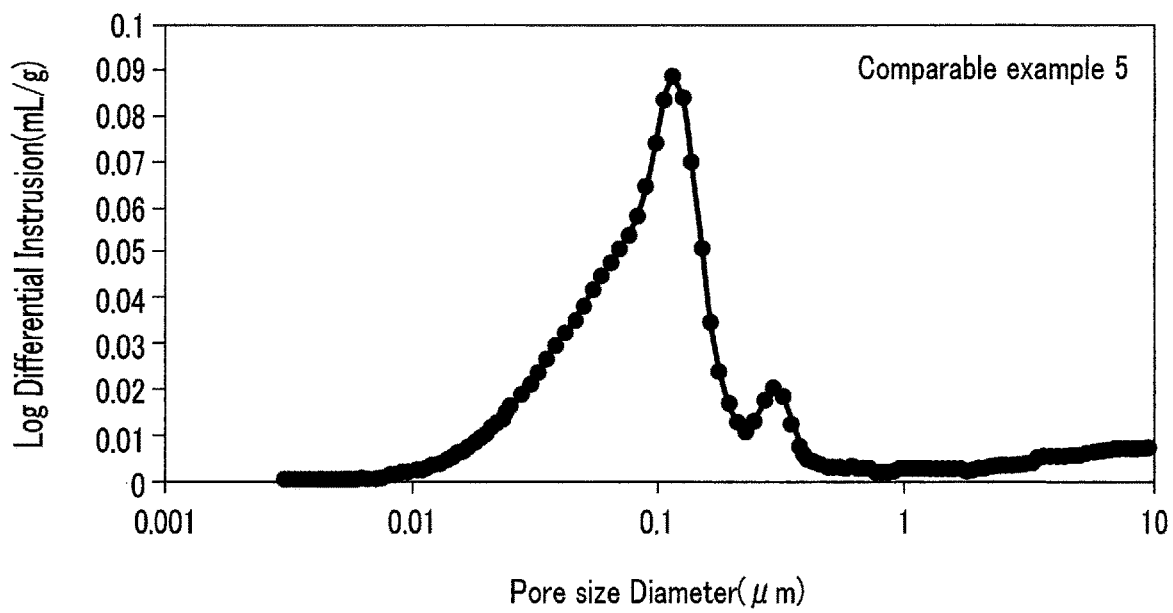
F I G. 13
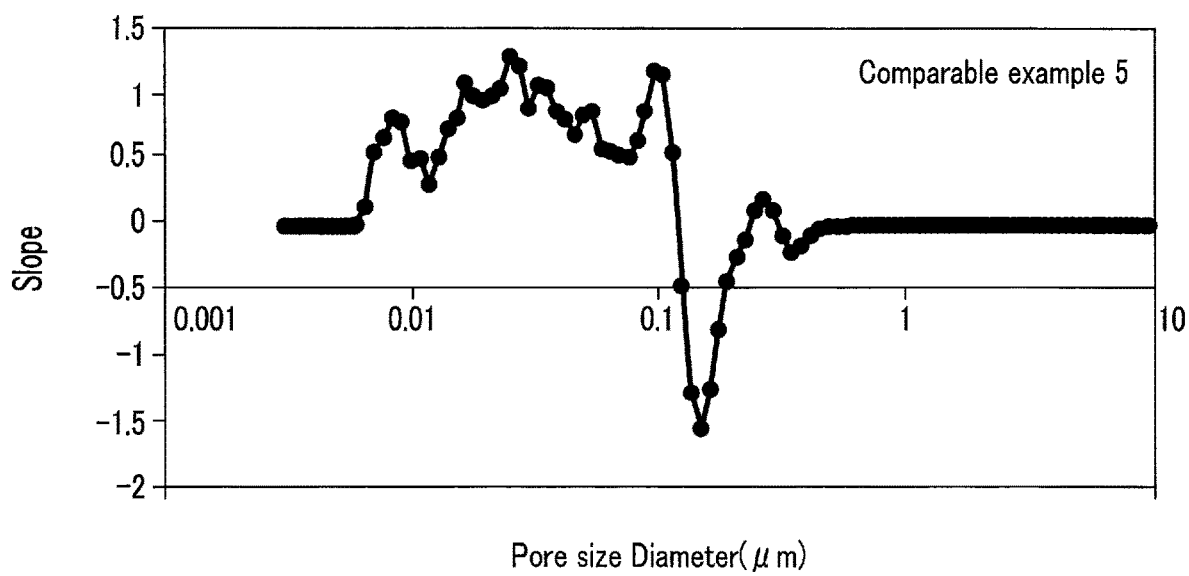
F I G. 14

ELECTRODE, SECONDARY BATTERY, BATTERY PACK, AND VEHICLE

CROSS REFERENCE TO RELATED APPLICATIONS

This application is based upon and claims the benefit of priority from Japanese Patent Application No. 2019-167418, filed Sep. 13, 2019, the entire contents of which are incorporated herein by reference.

FIELD

Embodiments described herein relate generally to an electrode, a secondary battery, a battery pack, and a vehicle.

BACKGROUND

A lithium ion secondary battery such as a nonaqueous electrolyte battery is a rechargeable battery that is charged and discharged through lithium ions moving between the positive electrode and the negative electrode. The positive electrode and the negative electrode retain a nonaqueous electrolyte containing lithium ions. Nonaqueous electrolyte batteries are envisaged to be used not only as a power source for small-sized electronic equipment but also as a medium to high power source for vehicles, installations and the like. In particular, regarding their use as a medium to high power source, input/output performance is required.

Mixing a solid polymer electrolyte or carbon fiber into an electrode is reported as one way to enhance the input/output performance of a secondary battery.

BRIEF DESCRIPTION OF THE DRAWINGS

FIG. 12 is a view that schematically illustrates an example of a control system related to an electric system in the vehicle according to the embodiment;

FIG. 13 is a graph showing the log differential pore volume distribution curve for the active material-containing layer of the electrode according to Comparative Example 5; and FIG. 14 is a graph showing an example slope distribution curve for the electrode according to Comparative Example 5.

DETAILED DESCRIPTION

Figure 1:
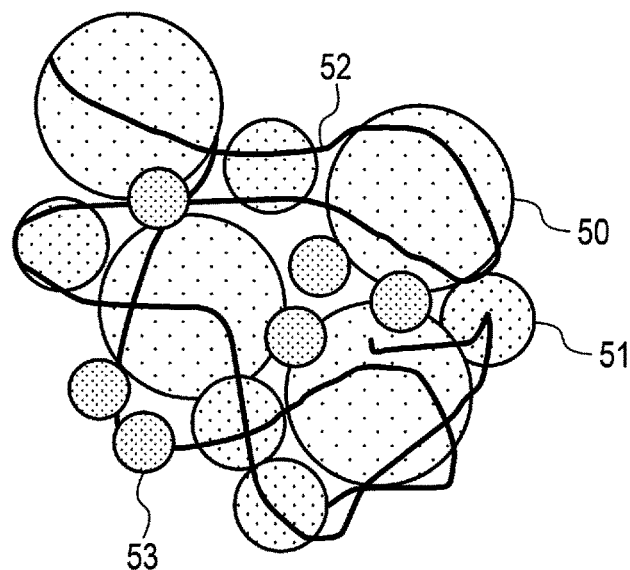
FIG. 1 is a schematic diagram showing an example active material-containing layer of the electrode according to the embodiment.

According to one embodiment, an electrode is provided. The electrode includes an active material-containing layer. The active material-containing layer includes an active material, inorganic solid particles having lithium ion conductivity, and carbon fiber. The active material includes a lithium-containing transition metal composite oxide. The active material-containing layer has a first peak indicating a maximum log differential pore volume in a log differential pore volume distribution curve according to mercury porosimetry. A pore diameter $D_M$ at the first peak is 0.05 μm to 10 μm. A value SA−SB is 1.4 or more in a slope distribution curve of the active material-containing layer, where a vertical axis of the slope distribution curve represents a slope of a straight line passing through two adjacent measurement points on the log differential pore volume distribution curve and a horizontal axis of the slope distribution curve represents a smaller pore diameter of the two adjacent measurement points. The value SA−SB is obtained by subtracting a minimum slope value SB from a maximum slope value SA. The minimum slope value SB is in a range of pore diameters smaller than the pore diameter $D_M$ at the first peak and greater than the pore diameter at the maximum slope value SA. The maximum slope value SA is in a range of pore diameters smaller than the pore diameter $D_M$ at the first peak.

According to another embodiment, a secondary battery is provided. The secondary battery includes a positive electrode, a negative electrode, and an electrolyte. At least one of the positive electrode and the negative electrode is the electrode according to the embodiment.

According to another embodiment, a battery pack is provided. The battery pack includes the secondary battery according to the embodiment.

According to another embodiment, a vehicle is provided. The vehicle includes the battery pack according to the embodiment.

One way to improve input/output performance of an electrode is to mix inorganic solid particles, such as solid electrolyte particles, having lithium ion conductivity into an active material-containing layer. The solid electrolyte particles are better in lithium ion conductivity than active materials. Mixing in the solid electrolyte particles can lower lithium ion conduction resistance in the active material-containing layer. However, the solid electrolyte particles have no electronic conductivity. Accordingly, mixing in the solid electrolyte particles lowers the electronic conductivity of the active material-containing layer. That is, mixing the solid electrolyte particles into the active material-containing layer decreases lithium ion conduction resistance of the active material-containing layer, but increases electronic conduction resistance thereof and thus has a limited effect on improving input/output performance.

First Embodiment

According to an embodiment, an electrode is provided. The electrode includes an active material, inorganic solid particles, and carbon fiber. The active material includes a lithium-containing transition metal composite oxide. The inorganic solid particles have lithium ion conductivity. The active material-containing layer has a first peak indicating a maximum log differential pore volume in a log differential pore volume distribution curve according to mercury porosimetry. The pore diameter $D_M$ at the first peak is 0.05 μm to 10 μm. In a slope distribution curve in which the vertical axis represents a slope of a straight line passing through two adjacent measurement points on the log differential pore volume distribution curve, and the horizontal axis represents a smaller pore diameter of the two adjacent measurement points, value SA−SB is 1.4 or more. The value SA−SB is obtained by subtracting, from a maximum slope value SA (a value SA indicating a maximum slope) in the range of pore diameters smaller than pore diameter $D_M$ at the first peak, a minimum slope value SB (a value SB indicating a minimum slope) in the range of pore diameters smaller than the pore diameter $D_M$ at the first peak and greater than the pore diameter at the maximum slope value SA.

Since the electrode according to the embodiment includes inorganic solid particles having lithium ion conductivity, the lithium ion conduction resistance of the active material-containing layer is low. In addition, since the electrode includes carbon fiber, an increase in electronic conduction resistance due to mixing of the inorganic solid particles can be suppressed. Further, the active material-containing layer having the pore diameter $D_M$ at the first peak in the range from 0.05 μm to 10 μm and having a value SA−SB of 1.4 or more is considered to be properly provided with pores having a relatively large diameter and pores having a relatively small diameter. The pores in the active material-containing layer retain electrolyte. Such an electrode can retain a sufficient amount of electrolyte in the active material-containing layer and can increase the contact area between the inorganic solid particles and the electrolyte. This can further decrease the lithium ion conduction resistance of the active material-containing layer and decrease the electron conduction resistance thereof. Therefore, employment of the electrode according to the embodiment can enhance input/output performance of a secondary battery.

FIG. 1 is a schematic diagram showing an example active material-containing layer of the electrode according to the embodiment. The active material-containing layer shown in FIG. 1 includes active material particles 50, inorganic solid particles 51, carbon fiber 52, and granular carbon 53. The active material particles 50, the inorganic solid particles 51, and the granular carbon 53 are in contact with the carbon fiber 52, which is in a long and thin string form. The carbon fiber 52 and the granular carbon 53 form an electro-conduction path. The granular carbon 53 is present between the active material particles 50, between the inorganic solid particles 51, and between the active material particles 50 and the inorganic solid particles 51. The carbon fiber 52 can be present between an active material particle 50 and an inorganic solid particle 51 that are distant from each other. Interstices between the active material particles 50, the inorganic solid particles 51, and the granular carbon 53 can be filled with electrolyte not illustrated. The granular carbon 53 may be omitted. The active material-containing layer shown in FIG. 1 can maintain an electro-conduction path provided by carbon fiber 52 even when active material particles 50 swell or contract.

Figure 2:
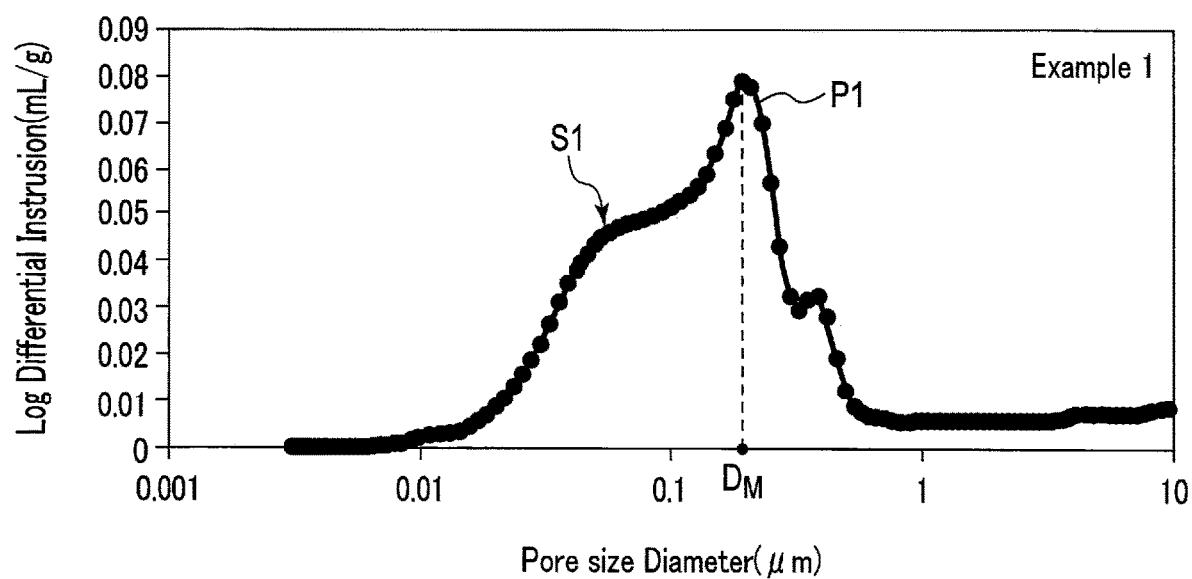
FIG. 2 is a graph showing an example log differential pore volume distribution curve for the active material-containing layer of the electrode according to the embodiment.

FIG. 2 is a graph showing an example log differential pore volume distribution curve for the active material-containing layer of the electrode according to the embodiment. The log differential pore volume distribution curve of the active material-containing layer is obtained by mercury porosimetry, which will be described later. The graph shown in FIG. 2 relates to Example 1, which will be described later. In the log differential pore volume distribution curve shown in FIG. 2, the vertical axis represents a log differential pore volume and the horizontal axis represents a pore diameter.

The log differential pore volume distribution curve of the active material-containing layer includes first peak P1. First peak P1 is a peak that has the highest value on the vertical axis in the log differential pore volume distribution curve. When the pore diameter $D_M$ at first peak P1 showing the maximum height in the log differential pore volume distribution, namely, a mode diameter, is in the range from 0.05 μm to 10 μm, pores having a relatively large diameter are considered as having been provided sufficiently in the active material-containing layer. Thus, such an electrode can retain a sufficient amount of electrolyte in the active material-containing layer. The pore diameter $D_M$ at first peak P1 is preferably 0.10 μm to 0.50 μm.

In addition, the log differential pore volume distribution curve of the active material-containing layer includes shoulder S1 in the range of pore diameters smaller than the pore diameter at first peak P1. Shoulder S1 refers to a section of gentle curve gradient after the curve becomes steeper as the log differential pore volume increases according to the increase in pore diameter and then a rate of increase in log differential pore volume according to the increase in pore diameter decreases. Value SA−SB being 1.4 or more indicates that this shoulder S1 is sufficiently large. A large shoulder S1 indicates that many pores having a diameter smaller than the mode diameter are provided in the active material-containing layer. The many pores having such a relatively small diameter increases the contact area between the inorganic solid particles and the electrolyte, and thus can further enhance a lithium ion conduction resistance decreasing effect of the inorganic solid particles. Value SA−SB does not have a particular upper limit, but is for example 3.0 or less. Value SA−SB is preferably 1.5 to 2.0.

The total pore volume of the active material-containing layer according to mercury porosimetry is preferably 0.05 mL/g to 0.10 mL/g. An active material-containing layer having a total pore volume within this range has a high energy density and can retain a sufficient amount of electrolyte. The total pore volume is more preferably 0.06 mL/g to 0.08 mL/g.

The log differential pore volume distribution curve of the active material-containing layer according to mercury porosimetry may be obtained, for example, by the following method.

First, when an electrode is incorporated in a secondary battery, the secondary battery is placed in a discharged state and then disassembled to take out the electrode. The disassembling is conducted in a glovebox filled with an inert gas, such as argon. The discharged state means a state where the battery has been discharged until the charge rate thereof becomes 0%. The electrode taken out is washed with a solvent, and then dried. For the solvent, ethyl methyl carbonate is used, for example. The dried electrode is cut into a plurality of sample pieces. The sample pieces take the shape of, for example, a rectangular sheet having a short side of 1.25 cm and longer side of 2.5 cm.

Next, the sample pieces are placed in a measurement cell of a measurement device, and mercury is forced to intrude into the pores of the sample pieces. The number of the sample pieces is, for example, 16 to 32. As the measurement cell, a large volume 5 cc cell having a stem volume of 0.4 cc is used, for example. As the measurement device, Autopore 9520 model manufactured by Shimadzu Corporation is used, for example. The measurement is conducted, for example, taking 7 kPa as an initial pressure and 414 MPa as an end pressure. The measurement is conducted at every pressure $1.1^n$ times the initial pressure, where n is a positive integer. That is, the measurement is conducted at measurement points of, for example, 7 kPa, 7.7 kPa, 8.47 kPa, 9.317 kPa, . . . , 7×$1.1^n$ kPa until the pressure reaches 414 MPa. Seven kPa corresponds to 1.0 pound per square inch absolute (psia) and corresponds to a pore having a diameter of about 180 μm. 414 MPa corresponds to about 6 psia and corresponds to a pore having a diameter of about 0.003 μm. The mercury contact angle is 130 degrees, and the mercury surface tension is 485 dynes/cm. By processing the data obtained, a log differential pore volume distribution curve and a total pore volume of the active material-containing layer can be obtained.

Further, a slope distribution curve can be obtained from the log differential pore volume distribution curve of the active material-containing layer. The vertical axis of the slope distribution curve represents a slope of a straight line passing through two adjacent measurement points on the log differential pore volume distribution curve, and a horizontal axis thereof represents a smaller pore diameter of the two adjacent measurement points. That is, in the log differential pore volume distribution curve, measurement is conducted at every pressure $1.1^n$ times the initial pressure, and the n-th measurement point P has coordinates P(X1, Y1), with X1 being a pore diameter corresponding to a pressure of $1.1^n$ times the initial pressure and Y1 indicating the log differential pore volume of this pore diameter. In addition, the (n−1)-th measurement point has coordinates Q (X2, Y2), with X2 being a pore diameter corresponding to a pressure $1.1^{n-1}$ times the initial pressure and Y2 being the log differential pore volume of this pore diameter. Slope SR1 of the straight line passing through the n-th measurement point P and the (n−1)-th measurement point Q is obtained by (Y2−Y1)/(X2−X1). Point P1 (X1, SR1) is plotted by taking this slope SR1 as a value on the vertical axis and pore diameter X1 corresponding to the n-th pressure as a value on the horizontal axis. This plotting is conducted every two adjacent measurement points on the log differential pore volume distribution curve, thereby obtaining the slope distribution curve.

Figure 3:
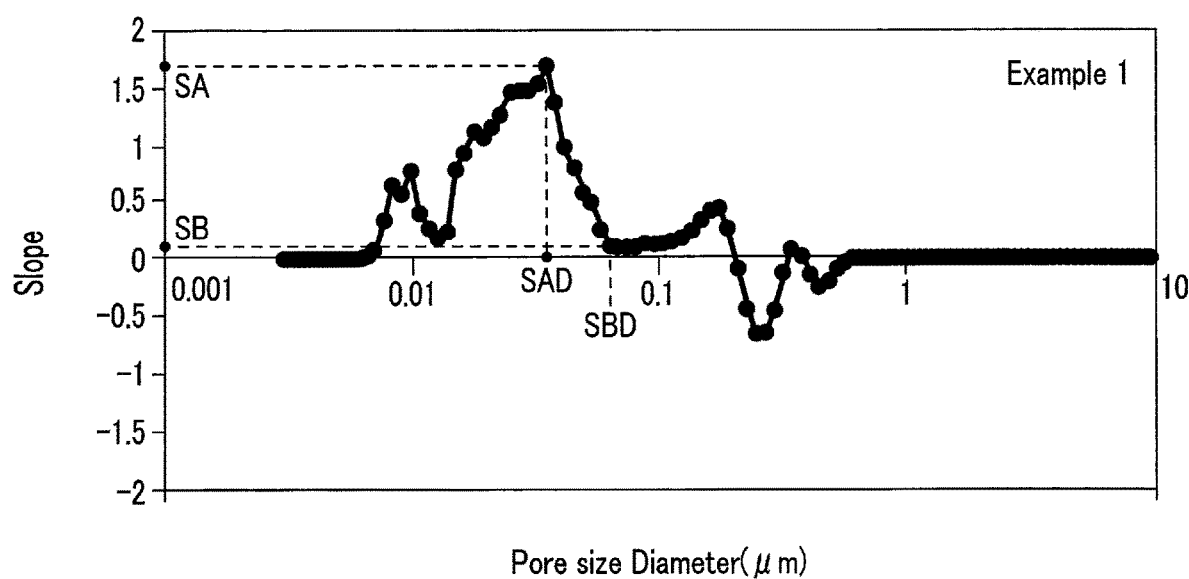
FIG. 3 is a graph showing an example slope distribution curve for the electrode according to the embodiment.

FIG. 3 is a graph showing an example slope distribution curve for the electrode according to the embodiment. The slope distribution curve shown in FIG. 3 is obtained by the method described above. The graph shown in FIG. 3 relates to Example 1, which will be described later. In the slope distribution curve shown in FIG. 3, the vertical axis is a slope and the horizontal axis is a pore diameter.

In the slope distribution curve, the maximum slope value SA in the range of pore diameters smaller than the pore diameter $D_M$ at the first peak being large indicates that the log differential pore volume increases steeply in accordance with an increase in the pore diameter. In addition, the minimum slope value SB in the range of pore diameters smaller than the pore diameter $D_M$ at the first peak and larger than the pore diameter of the maximum slope value SA being small indicates that an increase in log differential pore volume according to an increase in the pore diameter is substantially equal, namely, indicates the presence of the section corresponding to the "shoulder" described above. Therefore, value SA−SB being large may indicate the "shoulder" being large, namely, the presence of many pores having a relatively small pore diameter. The shoulder on the log differential pore volume distribution curve preferably appears at, for example, 0.02 μm to 0.1 μm. Accordingly, it is preferable that the maximum slope value SA and the minimum slope value SB appear in the range of 0.02 μm to 0.1 μm in the slope distribution curve.

In addition, value SBD−SAD obtained by subtracting the pore diameter SAD of the maximum value SA from the pore diameter SBD of the minimum value SB is preferably 0.010 μm or more. Value SBD−SAD being large indicates that a steep increase in log differential pore volume according to an increase in the pore diameter continues from pore diameter SAD to the proximity of pore diameter SBD. Accordingly, value SBD−SAD being large indicates that pores having a relatively small diameter are sufficiently provided for the active material-containing layer. Value SBD−SAD is preferably 0.015 μm to 1.2 μm.

The electrode according to the embodiment can be used as a positive electrode or as a negative electrode. The electrode according to the embodiment is preferably used as a positive electrode.

Hereinafter, the electrode according to the embodiment will be described in detail.

The electrode can include an active material-containing layer and a current collector. The active material-containing layer is supported by at least one surface of the current collector. The active material-containing layer may be supported by either surface or both surfaces of the current collector. The active material-containing layer may further include granular carbon and a binder in addition to the active material, the inorganic solid particles, and the carbon fiber.

The active material includes a lithium-containing transition metal composite oxide. The lithium-containing transition metal composite oxide preferably includes at least one transition metal selected from the group consisting of nickel, cobalt, and manganese. In addition to these transition metals, the lithium-containing transition metal composite oxide preferably further includes at least one element of titanium and aluminum. The lithium-containing transition metal composite oxide can be represented by $Li_{1-x}Ni_{1-a-b}Co_aMn_bA_cO_2$. A is at least one element selected from the group consisting of Al, Ti, Zr, Nb, Mg, Cr, V, Fe, Ta, Mo, Zn, Ca, Sn, Si, and P, where x is 0 to 1, a is 0 to 1, b is 0 to 1, the sum of a and b is 1 or less, and c is 0 to 1.

Examples of the lithium-containing transition metal composite oxide include lithium manganese composite oxides (e.g., $Li_xMn_2O_4$ or $Li_xMnO_2$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0\le x\le1$, $0<y<1$), lithium manganese cobalt composite oxides (e.g., $Li_xMn_yCo_{1-y}O_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium phosphates having an olivine structure (e.g., $Li_xFePO_4$; $0<x\le1$, $Li_xFe_{1-y}Mn_yPO_4$; $0<x\le1$, $0<y<1$, and $Li_xCoPO_4$; $0<x\le1$), and lithium nickel cobalt manganese composite oxides ($Li_xNi_{1-y-z}Co_yMn_zO_2$; $0<x\le1$, $0<y<1$, $0<z<1$, y+z<1).

The active material may include another oxide or sulfide. The electrode may include one kind of a compound alone or may contain two or more kinds of compounds in combination as the electrode active material. An example of the oxide and the sulfide is a compound which Li or Li ions can be inserted into and extracted from. Other examples of the oxide include manganese dioxides ($MnO_2$), iron oxides, copper oxides, nickel oxides, and vanadium oxides (e.g., $V_2O_5$). Other examples of the sulfide include iron sulfate [$Fe_2(SO_4)_3$].

The primary particle size of the positive electrode active material is preferably within a range of from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably within a range of from 0.1 m²/g to 10 m²/g. The positive electrode active material having a specific surface area of 0.1 m²/g or more can secure sufficient sites for inserting and extracting Li ions. The positive electrode active material having a specific surface area of 10 m²/g or less is easy to handle during industrial production, and can secure a good charge and discharge cycle performance.

The inorganic solid particles are mixed so as to increase lithium ion conductivity in the active material-containing layer. The inorganic solid particles preferably include at least one compound selected from the group consisting of: a first metal oxide including at least one element selected from the group consisting of Ti, Ge, Sr, Zr, Sn, Al, Sc, Y, Ba, P, and Ca; a lanthanide oxide; and a first sulfide including at least one element selected from the group consisting of Li, Ge, P, Si, Sn, Al, Ga, B, and In. The lanthanide oxide is an oxide including a lanthanide element, such as La, Ce, Pr, Nd, or the like. The first metal oxide may further include a lanthanide element, such as La or the like.

The inorganic solid particles are, for example, an oxide-based solid electrolyte or a sulfide-based solid electrolyte. The oxide-based solid electrolyte is preferably a lithium phosphoric acid solid electrolyte which has a Sodium (Na) Super Ionic Conductor (NASICON) type structure and which is represented by a general formula of $LiM_2(PO_4)_3$. M in the above-described general formula is, for example, at least one element selected from the group consisting of: titanium (Ti); germanium (Ge); strontium (Sr); zirconium (Zr); tin (Sn); aluminum (Al); and calcium (Ca). The lithium phosphoric acid solid electrolyte represented by the general formula of $LiM_2(PO_4)_3$ has an ionic conductivity of, for example, $1\times10^{-5}$ S/cm to $1\times10^{-3}$ S/cm.

Specific examples of the lithium phosphoric acid solid electrolyte having NASICON type structure include LATP ($Li_{1+x+y}Al_x$(Ti and/or Ge)$_{2-x}Si_yP_{3-y}O_{12}$ where $0<x\leq2$, $0\leq y<3$, $Li_{1+x}Al_xGe_{2-x}(PO_4)_3$ where $0\leq x\leq2$, and $Li_{1+x}Al_xZr_{2-x}(PO_4)_3$ where $0\leq x\leq2$, $Li_{1+2x}Zr_{1-x}Ca_x(PO_4)_3$ where $0\leq x<1$. $Li_{1+2x}Zr_{1-x}Ca_x(PO_4)_3$ is preferably used as inorganic solid electrolyte particles because of its high water-resistance and low reducing ability and its low cost.

In addition to the above lithium phosphoric acid solid electrolyte, examples of the oxide-base solid electrolyte include amorphous LIPON ($Li_{2.9}PO_{3.3}N_{0.46}$), $La_{5+x}A_xLa_{3-x}M_2O_{12}$ (where A is at least one selected from the group consisting of Ca, Sr, and Ba, and M is at least one of Nb and Ta), $Li_3M_{2-x}L_2O_{12}$ (where M is at least one of Ta and Nb, and L is Zr) $Li_{7-3x}Al_xLa_3Zr_3O_{12}$, and LLZ ($Li_7La_3Zr_2O_{12}$) having a garnet-type structure. One kind of the solid electrolyte or a mixture of two or more kinds thereof may be used. LIPON has an ionic conductivity of, for example, $1\times10^{-6}$ S/cm to $5\times10^{-6}$ S/cm. LLZ has an ionic conductivity of, for example, $1\times10^{-4}$ S/cm to $5\times10^{-4}$ S/cm.

Further, as the solid electrolyte particles, sodium-containing solid electrolyte can be used. The sodium-containing solid electrolyte has an excellent sodium ion conductivity. Examples of the sodium-containing solid electrolyte include β-alumina, sodium phosphate sulfide, sodium phosphate oxide, and the like. The sodium ion-containing solid electrolyte is preferably in the form of glass-ceramic.

The inorganic solid particles are preferably solid electrolyte having a lithium ion conductivity of $1\times10^{-5}$ S/cm or more at 25° C. The lithium ion conductivity can be measured by, for example, the alternating-current impedance method. To be more specific, first, the inorganic solid particles are molded by using a tablet making machine, thereby a pressed powder body is obtained. Both surfaces of this pressed powder body are gold (Au)-evaporated, thereby a measurement sample is obtained. The alternating-current impedance of the measurement sample is measured by using an impedance measurement instrument. As the measurement instrument, Solartron model 1260 Frequency Response Analyzer may be used, for example. The measurement is performed over a measurement frequency range of 5 Hz to 32 MHz at a temperature of 25° C. under argon atmosphere.

Subsequently, based on the measured alternating-current impedance, a complex impedance plot is prepared. The complex impedance plot involves plotting an imaginary component on a vertical axis and a real component on a horizontal axis. Ionic conductivity $\sigma_{Li}$ of the inorganic solid particles is calculated by the following equation. In the following equation, $Z_{Li}$ is a resistance calculated from a diameter of an arc of the complex impedance plot, S is an area, and d is a thickness.

$$\sigma_{Li}=(1/Z_{Li})\times(d/S) \quad \text{[Equation 1]}$$

The solid electrolyte is preferably a Lewis acid. Such a solid electrolyte is more likely to be positively charged, and thus can capture anions. This allows more lithium ions, which are cations, to travel easily in the active material-containing layer. Examples of such solid $Li_{1+x+y}Al_x$(Ti and/or Ge)$_{2-x}Si_yP_{3-y}O_{12}$, where $0<x\leq2$, $0\leq y<3$.

The inorganic solid particles are not limited to be in a particular shape, but can be in the form of, for example, spheres, ellipses, flats, fibers, or the like.

The average particle size of the inorganic solid particles is preferably 15 μm or less, and is more preferably 12 μm or less. When the inorganic solid particles have a smaller average particle size, the battery tends to have lower internal resistance.

The average particle size of the inorganic solid particles is preferably 0.01 μm or more, and is more preferably 0.1 μm or more. When the inorganic solid particles have a large average particle size, aggregation of the particles tends to be suppressed.

The average particle size of the inorganic solid particles refers to a particle size at which a cumulative volume is 50% in a particle-size distribution obtained by a laser diffraction particle size analyzer. As a sample for this particle size analysis, a dispersion solution having the inorganic solid particles diluted with ethanol in a concentration of 0.01 mass % to 5 mass % is used.

In the active material-containing layer, the mixing amount of the inorganic solid particles is preferably 0.1 parts by mass to 20 parts by mass, more preferably 0.5 parts by mass to 10 parts by mass, and even more preferably 3 parts by mass to 5 parts by mass, to 100 parts by mass of the active material. A large amount of inorganic solid particles can increase lithium ion conductivity in the active material-containing layer. On the other hand, an excessive amount of inorganic solid particles may decrease electronic conductivity of the active material-containing layer and energy density.

The carbon fiber and granular carbon are blended as an electro-conductive agent to enhance a current collecting performance and to suppress contact resistance between the active material and the current collector.

The carbon fiber is fibrous carbon having a ratio L1/S1 of length L1 in a longitudinal direction to thickness S1, namely, a diameter of a cross section perpendicular to the longitudinal direction, of 50 or more. The ratio L1/S1 is preferably 150 to 10000. A thickness of the carbon fiber is preferably 1 nm to 200 nm (i.e., 0.001 µm to 0.2 µm). A length of the carbon fiber is preferably 5 µm to 50 µm. Examples of the carbon fiber include vapor-grown carbon fibers (VGCFs). Examples of the VGCFs include carbon nanotubes (CNTs) and carbon nanofibers (CNFs). One of them may be used as the carbon fiber, or two or more may be used in combination as the carbon fiber.

In the active material-containing layer, the mixing amount of the carbon fiber is preferably 0.01 parts by mass to 10 parts by mass, and more preferably 0.1 parts by mass to 5 parts by mass, to 100 parts by mass of the active material. A large amount of carbon fiber can increase electronic conductivity of the active material-containing layer. On the other hand, an excessive amount of carbon fiber may decrease energy density.

The granular carbon refers to carbon granules of which a ratio L2/S2 of length L2 of the major axis to length S2 of the minor axis is less than 50. The granular carbon includes a scale-shaped carbon. Examples of the granular carbon include carbonaceous materials, such as carbon black such as acetylene black and graphite. One of them may be used as the granular carbon, or two or more may be used in combination as the granular carbon.

In the active material-containing layer, the mixing amount of the granular carbon is preferably 0 parts by mass to 10 parts by mass, and more preferably 1 part by mass to 5 parts by mass, to 100 parts by mass of the active material. A large amount of granular carbon can increase electronic conductivity of the active material-containing layer. On the other hand, an excessive amount of granular carbon may decrease energy density.

The binder is blended to embed gaps of the dispersed active material, and to bind the active material and a negative electrode current collector. Examples of the binder include polytetrafluoro ethylene (PTFE), polyvinylidene fluoride (PVdF), fluororubber, styrene-butadiene rubber, a polyacrylic acid compound, an imide compound, carboxymethyl cellulose (CMC) and salts of CMC. One of them may be used as the binder, or two or more may be used in combination as the binder.

In the active material-containing layer, the mixing amount of the binder is preferably 0 parts by mass to 10 parts by mass, and more preferably 1 part by mass to 5 parts by mass, to 100 parts by mass of the active material. A large amount of binder attains sufficient binding between the active material-containing layer and the current collector, and an excellent cyclic performance can be expected. On the other hand, an excessive amount of binder may decrease energy density.

The current collector adopts a material which is electrochemically stable in electric potential at which lithium (Li) is inserted into and extracted from the active material. The current collector is preferably made of, for example, copper, nickel, stainless steel, aluminum or aluminum alloy which contains one or more elements selected from: Mg; Ti; Zn; Mn; Fe; Cu; and Si. A thickness of the current collector is preferably 5 µm or more and 20 µm or less. The current collector having such a thickness can balance both of strength of the electrode and weight reduction.

Further, the current collector can include a part which has no the active material-containing layer formed on a surface thereof. This part can serve as a collector tab.

The density of the active material-containing layer is preferably 3.0 g/cm$^3$ to 3.6 g/cm$^3$, and more preferably 3.2 g/cm$^3$ to 3.5 g/cm$^3$.

Next, a method for manufacturing the electrode according to the embodiment will be described.

First, carbon fiber is dispersed in a solvent to prepare a carbon fiber-dispersed solution. Examples of the solvent include N-methyl-2-pyrrolidone. Subsequently, the carbon fiber-dispersed solution, a binder, and inorganic solid particles are mixed and stirred to prepare a first slurry. For the stirring process, a planetary mixer, for example, is used. The stirring process using the planetary mixer may be followed by a further stirring process using a bead mill, to prepare the first slurry.

Next, the first slurry and an active material are mixed optionally with granular carbon and a binder, and the mixture is stirred to prepare a second slurry. As a stirrer, a planetary mixer, for example, is used. The stirring speed is, for example, 30 rpm to 6000 rpm, and the stirring time is 10 minutes to 2 hours. As the stirring speed or the stirring time increases, the active material, the inorganic solid particles, or the like in the second slurry decrease in particle size; consequently, the pore diameter $D_M$ at the first peak in the active material-containing layer tends to become smaller. The stirring process using the planetary mixer may be followed by a further stirring process using a bead mill, to prepare the second slurry. Performing the further stirring process using a bead mill improves the dispersiveness in the second slurry. As the bead mill, a Continuous Horizontal-Type Ready Mill Model RMH-03 manufactured by AIMEX Co. is used, for example. A flow rate of the bead mill is, for example, 10 mL/min to 50 mL/min.

The second slurry is applied to either surface or both surfaces of a current collector, and the applied slurry is dried to obtain a stack including the active material-containing layer and the current collector. This stack is pressed, and thereby an electrode is obtained. In this method, the inorganic solid particles are sufficiently mixed with the carbon fiber to form a composite of the inorganic solid particles and the carbon fiber, and then the composite is mixed with the active material. This increases a number of contacts between the inorganic solid particles and the carbon fiber, attaining an active material-containing layer having more excellent electronic conductivity.

The electrode according to the first embodiment described above includes the active material-containing layer that includes the active material containing the lithium-containing transition metal composite oxide, the inorganic solid particles having lithium ion conductivity, and the carbon fiber, in which the pore diameter $D_M$ at the first peak on the log differential pore volume distribution curve of the active material-containing layer according to mercury porosimetry is 0.05 µm to 10 µm, and value SA−SB in the slope distribution curve is 1.4 or more. By using this electrode, a secondary battery excellent in input/output performance can be attained.

Second Embodiment

According to a second embodiment, a secondary battery including a negative electrode, a positive electrode, and an electrolyte can be provided. At least one of the negative electrode and the positive electrode is the electrode according to the first embodiment. When either the negative electrode or the positive electrode is the electrode according to the first embodiment, the counter electrode may or may not have a log differential pore volume distribution curve similar to that of the first embodiment.

The secondary battery according to the second embodiment can further include a separator disposed between the positive electrode and the negative electrode. The negative electrode, the positive electrode, and the separator can constitute an electrode group. The electrolyte can be retained in the electrode group.

In addition, the secondary battery according to the second embodiment can further include a container member for storing the electrode group and the electrolyte.

Moreover, the secondary battery according to the second embodiment can further include a negative electrode terminal electrically coupled to the negative electrode, and a positive electrode terminal electrically coupled to the positive electrode.

The secondary battery according to the second embodiment can be, for example, a lithium ion secondary battery. Further, the secondary battery includes a nonaqueous electrolyte secondary battery that includes a nonaqueous electrolyte.

Hereinafter, the counter electrode, the electrolyte, the separator, the container member, the negative electrode terminal and the positive electrode terminal will be described in detail.

1) Counter Electrode

The counter electrode can include an active material-containing layer and a current collector. The active material-containing layer may be supported by either surface or both surfaces of the current collector. The active material-containing layer can contain an active material, an electro-conductive agent, and a binder. The active material-containing layer may or may not further include inorganic solid particles and carbon fiber. The counter electrode is a negative electrode when the electrode according to the embodiment is a positive electrode, and is a positive electrode when the electrode according to the embodiment is a negative electrode. The counter electrode is preferably a negative electrode. Here, the following describes the counter electrode that is a negative electrode.

The active material may include a titanium-containing composite oxide. The titanium-containing composite oxide preferably includes at least one compound represented by a general formula selected from the group consisting of $A_xTiM_yNb_{2-y}O_{7\pm z}$ ($0 \leq x \leq 5$, $0 \leq y \leq 0.5$, $-0.3 \leq z \leq 0.3$, M is at least one metal other than Ti and Nb, A is Li or Na), $Li_{2+a}Na_2Ti_6O_{14}$ ($0 \leq a \leq 6$), and $Li_xTiO_2$ ($0 \leq x \leq 1$).

The titanium-containing composite oxide may include at least one compound selected from a group consisting of lithium titanate having a ramsdellite structure (for example, $Li_{2+y}Ti_3O_7$, $0 \leq y \leq 3$), lithium titanate having a spinel structure (for example, $Li_{4+x}Ti_5O_{12}$, $0 \leq x \leq 3$), monoclinic titanium dioxide ($TiO_2$), anatase-type titanium dioxide, rutile-type titanium dioxide, hollandite-type titanium composite oxide, orthorhombic titanium composite oxide and monoclinic niobium-titanium composite oxide.

Examples of the orthorhombic titanium composite oxide includes a compound represented by a general formula of $Li_{2+a}M(I)_{2-b}Ti_{6-c}M(II)_dO_{14+\sigma}$. M(I) is at least one element selected from the group consisting of Sr, Ba, Ca, Mg, Na, Cs, Rb, and K. M(II) is at least one element selected from the group consisting of Zr, Sn, V, Nb, Ta, Mo, W, Y, Fe, Co, Cr, Mn, Ni, and Al. In the general formula, $0 \leq a \leq 6$, $0 \leq b < 2$, $0 \leq c < 6$, $0 \leq d < 6$. Specific examples of the orthorhombic titanium composite oxide include $Li_{2+a}Na_2Ti_6O_{14}$ ($0 \leq a \leq 6$).

As an example of the monoclinic niobium titanium composite oxide, a compound represented by $Li_xTi_{1-y}M1_yNb_{2-z}M2_zO_{7+\delta}$ can be exemplified. Herein, M1 is at least one selected from the group consisting of: Zr; Si; and Sn. M2 is at least one selected from the group consisting of: V; Ta; and Bi. Respective subscripts in the composition formulae represent $0 \leq x \leq 5$, $0 \leq y < 1$, $0 \leq z < 2$ and $-0.3 \leq \delta \leq 0.3$. As a specific example of the monoclinic-system niobium-titanium composite oxide, $Li_xNb_2TiO_7$ ($0 \leq x \leq 5$) can be exemplified.

As other example of the monoclinic niobium-titanium composite oxide, a compound represented by $Li_xTi_{1-y}M3_{y+z}Nb_{2-z}O_{7-\delta}$ can be exemplified. Herein, M3 is at least one selected from Mg, Fe, Ni, Co, W, Ta and Mo. Respective subscripts in the composition formula represent $0 \leq x < 5$, $0 \leq y < 1$, $0 \leq z \leq 2$ and $-0.3 \leq \delta \leq 0.3$.

The conductive agent is added to improve a current collection performance and to suppress the contact resistance between the active material and the current collector. Examples of the conductive agent include vapor grown carbon fiber (VGCF), carbon black such as acetylene black, and carbonaceous substances such as graphite. One of these may be used as the conductive agent, or two or more may be used in combination as the conductive agent. Further, instead of using the conductive agent, carbon coating or electronic conductive inorganic material coating may be applied onto surfaces of the active material particles.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylic acid compounds, imide compounds, carboxy methyl cellulose (CMC), and salts of the CMC. One of these may be used as the binder, or two or more may be used in combination as the binder.

Preferably, the mixing ratios of the active material, electro-conductive agent, and binder in the active material-containing layer are respectively 68 mass % to 96 mass %, 2 mass % to 30 mass %, and 2 mass % to 30 mass %. Setting the amount of the electro-conductive agent to be 2 mass % or more can improve the current collecting performance of the active material-containing layer. Further, setting the amount of the binder to be 2 mass % or more allows sufficient binding between the active material-containing layer and the current collector, and excellent cyclic performance can be expected. On the other hand, it is preferable for the purpose of increasing capacity that the electro-conductive agent and the binder each have an amount of 30 mass % or less.

The current collector adopts a material which is electrochemically stable in electric potential at which lithium (Li) is inserted into and extracted from the active material. The current collector is preferably made of, for example, copper, nickel, stainless steel, aluminum or aluminum alloy which contains one or more elements selected from: Mg; Ti; Zn; Mn; Fe; Cu; and Si. A thickness of the current collector is preferably 5 μm or more and 20 μm or less. The current collector having such a thickness can balance both of strength of the electrode and weight reduction.

Further, the current collector can include a part which has no the active material-containing layer formed on a surface thereof. This part can serve as a collector tab.

The electrode can be produced by, for example, the following method. First, an active material, an electro-conductive agent, and a binder are suspended in a solvent to prepare a slurry. This slurry is applied onto either surface or both surfaces of the current collector. Subsequently, the applied slurry is dried, thereby a stack including the active material-containing layer and the current collector is obtained. Thereafter, this stack is pressed. In this way, the electrode is produced.

Alternatively, the electrode may be produced by the following method. First, the active material, the electro-conductive agent, and the binder are mixed to obtain a mixture. Subsequently, this mixture is shaped into pellets.

Thereafter, the pellets are disposed on the current collector, thereby an electrode can be obtained.

2) Electrolyte

As the electrolyte, for example, a liquid nonaqueous electrolyte or a gel nonaqueous electrolyte may be used. The liquid nonaqueous electrolyte is prepared by dissolving an electrolyte salt in an organic solvent. The concentration of the electrolyte salt is preferably 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethansulfonate ($LiCF_3SO_3$), bistrifluoromethylsulfonylimide lithium (LiTFSI; $LiN(CF_3SO_2)_2$), and mixtures thereof. The electrolyte salt is preferably less likely to be oxidized even at high potentials, and $LiPF_6$ is most preferred.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel-like nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, the nonaqueous electrolyte may be, for example, a room temperature molten salt (ionic melt) including lithium ions, a polymer solid electrolyte, or an inorganic solid electrolyte, other than the liquid nonaqueous electrolyte or the gel nonaqueous electrolyte.

The room temperature molten salt (ionic melt) means compounds which may exist in a liquid state at normal temperature (15 to 25° C.) among organic salts constituted of combinations of organic cations and anions. The room temperature molten salts include those which singly exist in a liquid state, those which are put into a liquid state when mixed with an electrolyte, those which are put into a liquid state when dissolved in an organic solvent, and mixture thereof. Generally, the melting point of the room temperature molten salt used in a secondary battery is 25° C. or less. Further, the organic cation generally has a quaternary ammonium skeleton.

The polymer solid electrolyte is prepared by dissolving the electrolyte salt in a polymeric material, and solidifying it.

3) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

4) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member can be properly selected depending on battery size or intended use of the battery.

5) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

6) Positive Electrode Terminal

The positive electrode terminal may be made of, for example, a material that is electrically stable in the potential range of 3 V to 4.5 V (vs. Li/Li$^+$) relative to the oxidation-and-reduction potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the second embodiment will be more specifically described with reference to the drawings.

Figure 4:
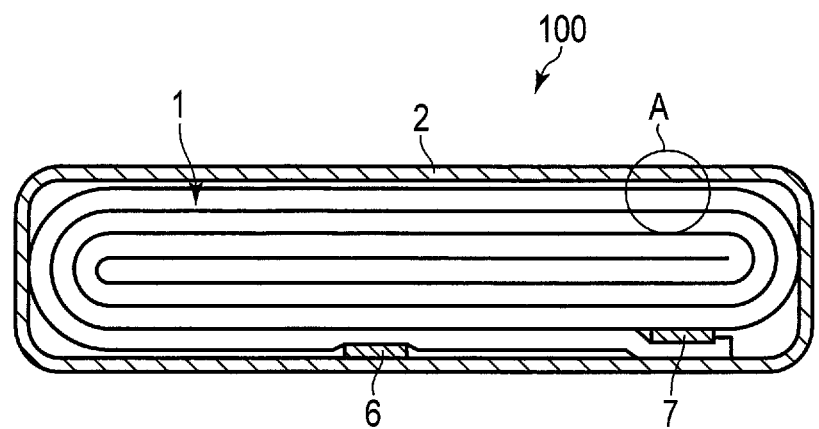
FIG. 4 is a cross-sectional view schematically showing an example of a secondary battery according to the embodiment.
Figure 5:
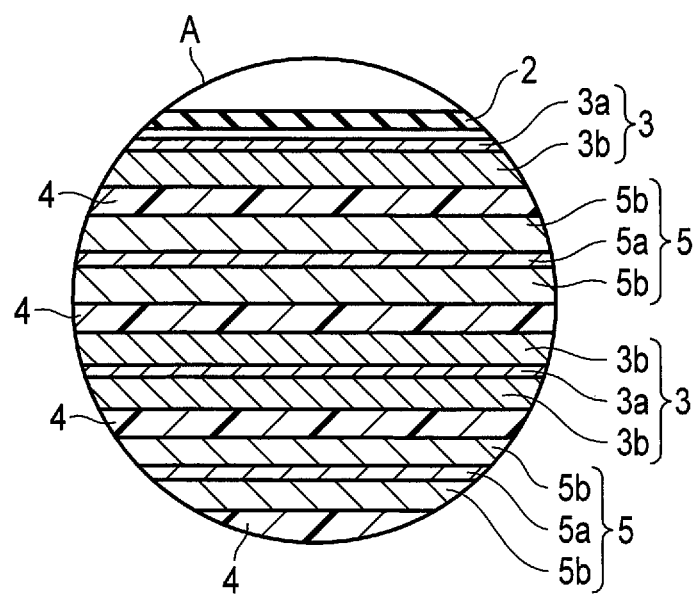
FIG. 5 is an enlarged cross-sectional view of section A of the secondary battery shown in FIG. 4.

FIG. 4 is a cross-sectional view schematically showing an example of a secondary battery according to the embodiment. FIG. 5 is an enlarged cross-sectional view of section A of the secondary battery shown in FIG. 4.

The secondary battery 100 shown in FIGS. 4 and 5 includes a bag-shaped container member 2 shown in FIG. 4, an electrode group 1 shown in FIGS. 4 and 5, and an electrolyte, which is not shown. The electrode group 1 and the electrolyte are housed in the bag-shaped container member 2. The electrolyte (not shown) is held in the electrode group 1.

The bag shaped container member 2 is made of a laminate film including two resin layers and a metal layer sandwiched between the resin layers.

As shown in FIG. 4, the electrode group 1 is a wound electrode group in a flat form. The wound electrode group 1 in a flat form includes a negative electrode 3, a separator 4, and a positive electrode 5, as shown in FIG. 5. The separator 4 is sandwiched between the negative electrode 3 and the positive electrode 5.

The negative electrode 3 includes a negative electrode current collector 3a and a negative electrode active material-containing layer 3b. The active material is included in the negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 5. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 4, a negative electrode terminal 6 and positive electrode terminal 7 are positioned in vicinity of the outer peripheral edge of the wound electrode group 1. The negative electrode terminal 6 is connected to a portion of the negative electrode current collector 3a of the negative electrode 3 positioned outermost. The positive electrode terminal 7 is connected to the positive electrode current collector 5a of the positive electrode 5 positioned outermost. The negative electrode terminal 6 and the positive electrode terminal 7 extend out from an opening of the bag-shaped container member 2. The bag-shaped container member 2 is heat-sealed by a thermoplastic resin layer arranged on the interior thereof.

Figure 6:
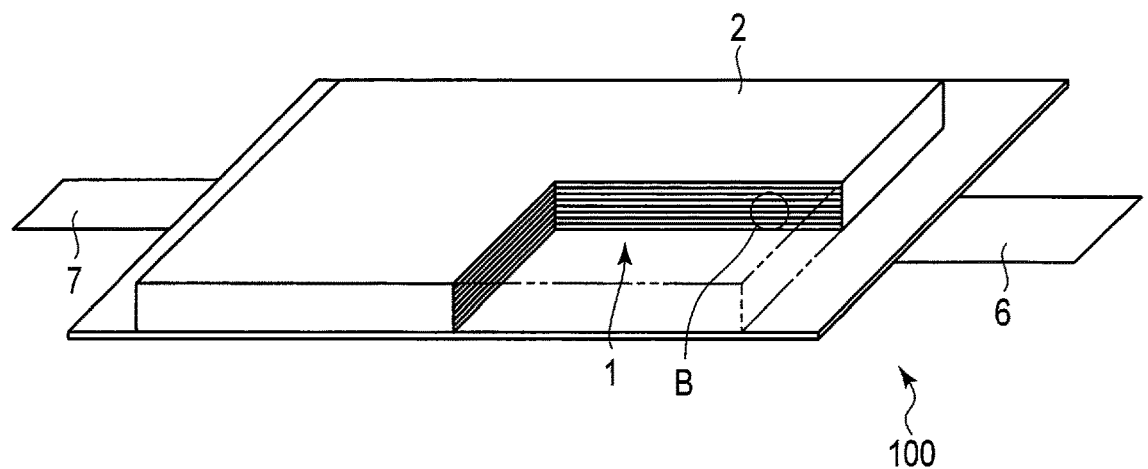
FIG. 6 is a partially cut-out perspective view schematically showing another example of a secondary battery according to the embodiment.
Figure 7:
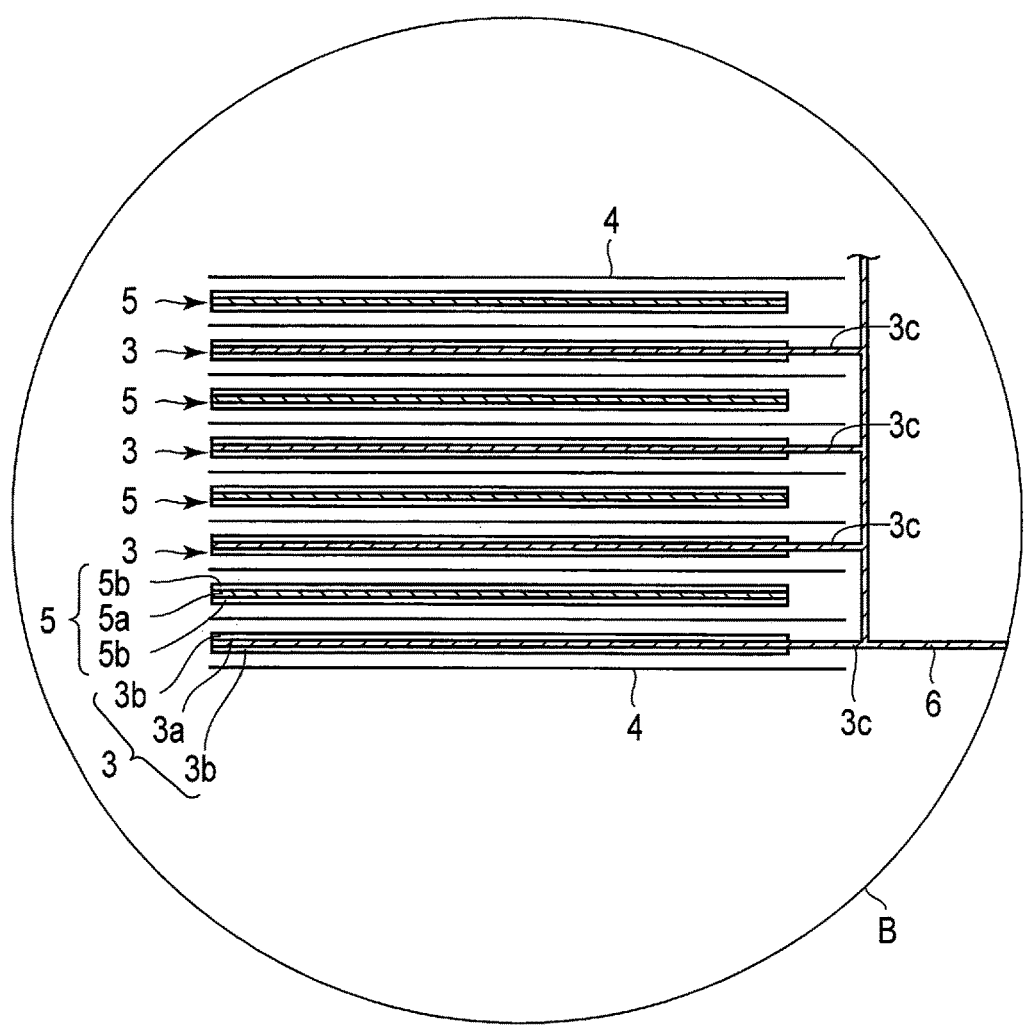
FIG. 7 is an enlarged cross-sectional view of section B of the secondary battery shown in FIG. 6.

The secondary battery according to the second embodiment is not limited to the secondary battery of the structure shown in FIGS. 4 and 5, and may be, for example, a battery of a structure as shown in FIGS. 6 and 7.

FIG. 6 is a partially cut-out perspective view schematically showing another example of a secondary battery according to the embodiment. FIG. 7 is an enlarged cross-sectional view of section B of the secondary battery shown in FIG. 6.

The secondary battery 100 shown in FIGS. 6 and 7 includes an electrode group 1 shown in FIGS. 6 and 7, a container member 2 shown in FIG. 6, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 7, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plurality of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 7, the portion 3c serving as the negative electrode tab does not overlap the positive electrode 5. A plurality of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3 c), the positive electrode tab does not overlap the negative electrode 3. Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the second embodiment includes the electrode according to the first embodiment. For this reason, the secondary battery according to the second embodiment can implement excellent input/output performance.

Third Embodiment

According to a third embodiment, a battery module is provided. The battery module according to the third embodiment includes plural secondary batteries according to the second embodiment.

In the battery module according to the third embodiment, each of the single batteries may be arranged electrically connected in series, in parallel, or in a combination of in-series connection and in-parallel connection.

An example of the battery module according to the third embodiment will be described next with reference to the drawings.

Figure 8:
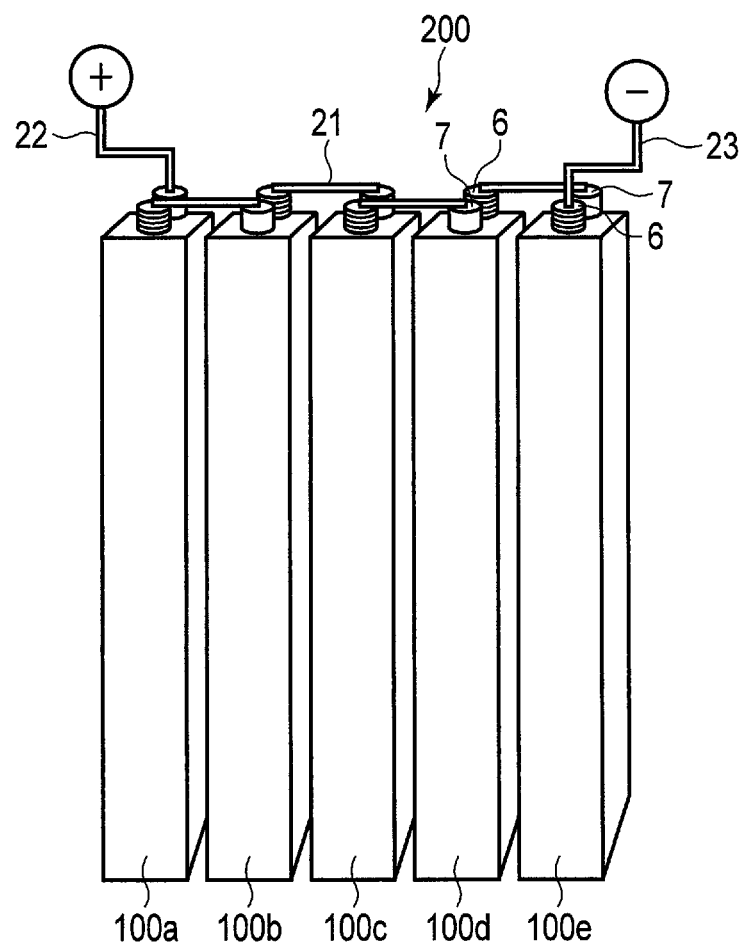
FIG. 8 is a perspective view schematically showing an example of the battery module according to the embodiment.

FIG. 8 is a perspective view schematically showing an example of the battery module according to the embodiment. A battery module 200 shown in FIG. 8 includes five single-batteries 100a to 100e, four bus bars 21, a positive electrode-side lead 22, and a negative electrode-side lead 23. Each of the five single-batteries 100a to 100e is a secondary battery according to the second embodiment.

For example, a bus bar 21 connects a negative electrode terminal 6 of one single-battery 100a and a positive electrode terminal 7 of the single-battery 100b positioned adjacent. The five single-batteries 100 are thus connected in series by the four bus bars 21. That is, the battery module 200 shown in FIG. 8 is a battery module of five in-series connection. In the battery module including a plurality of the single-batteries which are electrically connected in parallel, the plurality of the single-batteries can be electrically connected to each other, by, for example, connecting a plurality of the negative electrode terminals to each other via a bus bar and connecting a plurality of the positive electrode terminals to each other via a bus bar, which is not illustrated though.

A positive electrode terminal 7 of at least one cell among five single-batteries 100a to 100e is electrically connected to a positive electrode lead 22 for external connection. Further, a negative electrode terminal 6 of at least one cell among the five single-batteries 100a to 100e is electrically connected to a negative electrode lead 23 for external connection.

The battery module according to the third embodiment includes the secondary battery according to the second embodiment. Hence, the battery module according to the third embodiment can implement excellent input/output performance.

Fourth Embodiment

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fourth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

Figure 9:
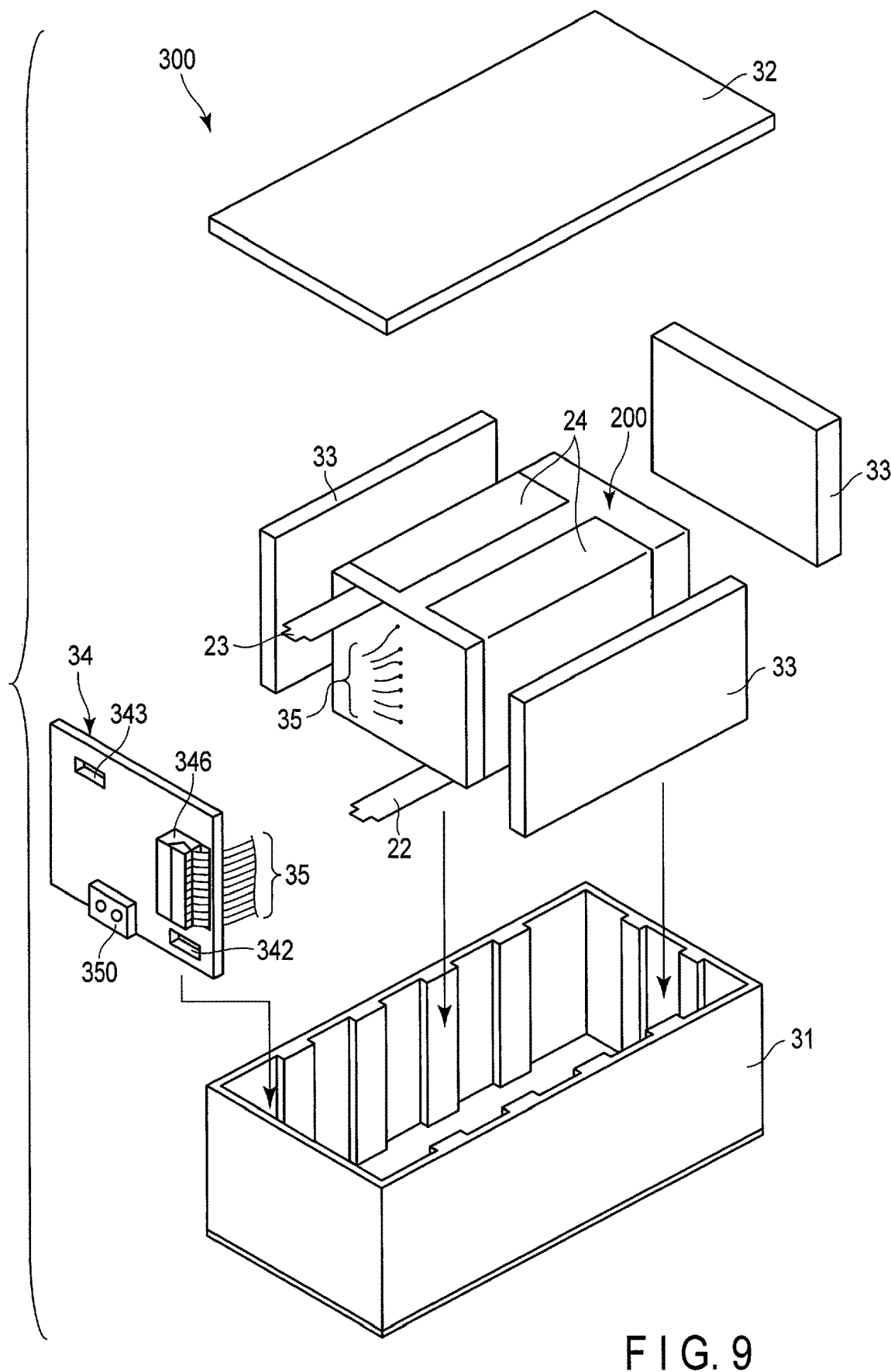
FIG. 9 is an exploded perspective view schematically showing an example of the battery pack according to the embodiment.
Figure 10:
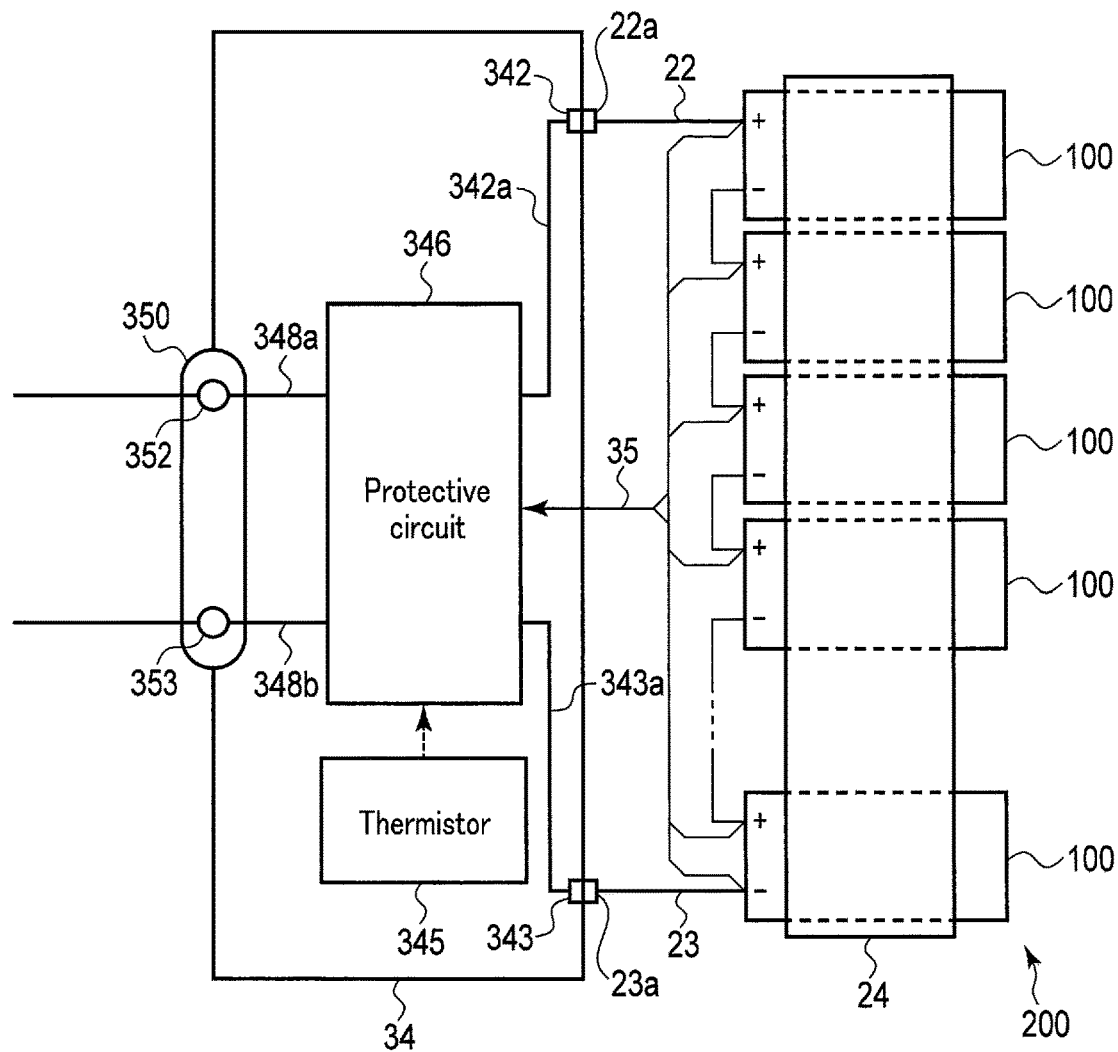
FIG. 10 is a block diagram showing an example of an electric circuit of the battery pack shown in FIG. 9.

FIG. 9 is an exploded perspective view schematically showing an example of the battery pack according to the embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

At least one of the plural single-batteries 100 is a secondary battery according to the second embodiment. The plural single-batteries 100 are electrically connected in series, as shown in FIG. 10. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

An end of the positive electrode-side lead 22 is connected to the battery module 200. The end of the positive electrode-side lead 22 is electrically connected to a positive electrode of one or more of the single-batteries 100. An end of the negative electrode-side lead 23 is connected to the battery module 200. The end of the negative electrode-side lead 23 is electrically connected to a negative electrode of one or more of the single-batteries 100.

A printed wiring board 34 is disposed on the one inner surface along the short-side direction of inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side (positive-side) wire 348a, and a minus-side (negative-side) wire 348b. One main surface of the printed wiring board 34 faces one side surface of the battery module 200. An insulating plate (not shown) is disposed in between the printed wiring board 34 and the battery module 200.

To the positive electrode-side connector 342, other end 22a of the positive electrode-side lead 22 is electrically connected. To the negative electrode-side connector 343, other end 23a of the negative electrode-side lead 23 is electrically connected.

The thermistor 345 is fixed to one main surface of the printed wiring board 34. The thermistor 345 detects the temperature of each single-battery 100 and transmits detection signals to the protective circuit 346.

The external power distribution terminal 350 is fixed to the other main surface of the printed wiring board 34. The external power distribution terminal 350 is electrically connected to device(s) that exists outside the battery pack 300. The external power distribution terminal 350 includes positive-side terminal 352 and negative-side terminal 353.

The protective circuit 346 is fixed to the other main surface of the printed wiring board 34. The protective circuit 346 is connected to the positive-side terminal 352 via the plus-side wire 348a. The protective circuit 346 is connected to the negative-side terminal 353 via the minus-side wire 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction, facing the printed wiring board 34 across the battery module 200 positioned therebetween. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external devices, based on detection signals transmitted from the thermistor 345 or detection signals transmitted from each single-battery 100 or the battery module 200.

An example of the detection signal transmitted from the thermistor 345 is a signal indicating that the temperature of the single-battery (single-batteries) 100 is detected to be a predetermined temperature or more. An example of the detection signal transmitted from each single-battery 100 or the battery module 200 is a signal indicating detection of over charge, over discharge, and overcurrent of the single-battery (single-batteries) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used respectively as a positive-side terminal 352 and a negative-side terminal 353 of the external power distribution terminal 350.

Such a battery pack 300 is used, for example, in applications where excellent cycle performance is demanded when a large current is extracted. More specifically, the battery pack 300 is used as, for example, a power source for electronic devices, a stationary battery, or an onboard battery for vehicles. An example of the electronic device is a digital camera. The battery pack 300 is particularly favorably used as an onboard battery.

The battery pack according to the fourth embodiment includes the secondary battery according to the second embodiment or the battery module according to the third embodiment. Hence, the battery pack according to the fourth embodiment can implement excellent input/output performance.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle. The vehicle may include a mechanism for converting kinetic energy of this vehicle into regenerative energy (Regenerator).

Examples of the vehicle according to the fifth embodiment include two- to four-wheeled hybrid electric automobiles, two- to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

The vehicle according to the fifth embodiment may be equipped with a plurality of the battery packs. In this case, batteries included in the respective battery packs may be electrically connected to each other in series, may be electrically connected to each other in parallel, or may be electrically connected to each other by a combination of series connections and parallel connections. For example, in a case where each battery pack includes a battery module, the battery modules may be electrically connected to each other in series, may be electrically connected to each other in parallel, or may be electrically connected to each other by a combination of series connections and parallel connections. Alternatively, in a case where each battery pack includes a single battery, the respective batteries may be electrically connected to each other in series, may be electrically connected in parallel, or may be electrically connected to each other by a combination of series connections and parallel connections.

An example of the vehicle according to the fifth embodiment is explained below, with reference to the drawings.

Figure 11:
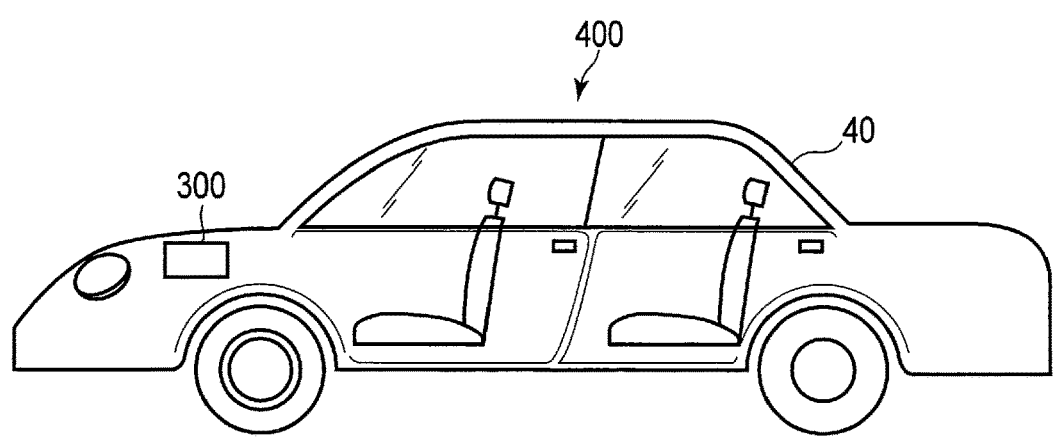
FIG. 11 is a partial perspective view that schematically illustrates an example of the vehicle according to the embodiment.

FIG. 11 is a partial perspective view that schematically illustrates an example of the vehicle according to the embodiment.

A vehicle 400, shown in FIG. 11 includes a vehicle body 40 and a battery pack 300 according to the fourth embodiment. In FIG. 11, the vehicle 400 is a four-wheeled automobile.

This vehicle 400 may have plural battery packs 300 installed. In such a case, the batteries (for example, single battery or battery module) included in the battery packs 300 may be connected in series, connected in parallel, or connected in a combination of in-series connection and in-parallel connection.

An example is shown in FIG. 11, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

Next, with reference to FIG. 12, an aspect of operation of the vehicle according to the fifth embodiment is explained.

FIG. 12 is a view that schematically illustrates an example of a control system related to an electric system in the vehicle according to the embodiment. A vehicle 400, shown in FIG. 12, is an electric automobile.

The vehicle 400, shown in FIG. 12, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 12, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit (for example, VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a to 300c are battery packs similar to the above-described battery pack 300, and battery modules 200a to 200c are battery modules similar to the above-described battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the second embodiment. The battery modules 200a to 200c each perform charging and discharging via a positive electrode terminal 413 and a negative electrode terminal 414.

The battery management unit 411 communicates with the battery module monitoring units 301a to 301c so as to collect information that is related to voltages, temperatures and the like of the respective single-batteries 100 included in the battery modules 200a to 200c which are included in the vehicle power source 41. Thereby, the battery management unit 411 can collect information that is related to maintenance of the vehicle power source 41.

The battery management unit 411 is connected to the battery module monitoring units 301a to 301c via the communication bus 412. In the communication bus 412, a set of communication lines is shared by plural nodes (with the battery management unit 411 and one or more of the battery module monitoring units 301a to 301c). The communication bus 412 is a communication bus structured according to, for example, a CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 can have an electromagnetic contactor (for example, a switch unit 415 shown in FIG. 12) which switches ON and OFF electrical connection between the positive electrode terminal 413 and the negative electrode terminal 414. The switch unit 415 includes: a precharge switch (not illustrated) which is turned on when the battery modules 200a to 200c are charged; and a main switch (not illustrated) which is turned on when battery output from the battery modules 200a to 200c is supplied to a load. Each of the precharge switch and the main switch includes a relay circuit (not illustrated), which is turned ON or OFF by a signal supplied to a coil that is disposed near a switch element. The electromagnetic contactor such as the switch unit 415 is controlled based on a control signal from the battery management unit 411 or a vehicle ECU 42 which controls operations of the entire vehicle 400.

The inverter 44 converts an input direct current voltage into a high voltage of a three-phase alternating current (AC) for driving the motor. A three-phase output terminal of the inverter 44 is connected to each three-phase input terminal of the driving motor 45. The inverter 44 is controlled based on the control signal from the battery management unit 411 or the vehicle ECU 42 for controlling the operations of the entire vehicle. By the control of the inverter 44, the output voltage from the inverter 44 is adjusted.

The driving motor 45 is rotated by electric power supplied from the inverter 44. Driving force generated by the rotation of the driving motor 45 is transmitted via, for example, a differential gear unit to an axle and driving wheels W.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

To the negative electrode terminal 414 of the vehicle power source 41, one of terminals of a connection line L1 is connected. Other terminal of the connection line L1 is connected to a negative electrode input terminal 417 of the inverter 44. The connection line L1 is provided with a current detecting unit (current detecting circuit) 416 in the battery management unit 411 between the negative electrode terminal 414 and the negative electrode input terminal 417.

To the positive electrode terminal 413 of the vehicle power source 41, one of terminals of a connection line L2 is connected. Other terminal of the connection line L2 is connected to a positive electrode input terminal 418 of the inverter 44. The connection line L2 is provided with the switch apparatus 415 between the positive electrode terminal 413 and the positive electrode input terminal 418.

The external terminal 43 is connected to the battery management unit 411. The external terminal 43 is able to connect, for example, to an external power source.

The vehicle ECU 42 controls the vehicle power source 41, the switch unit 415, the inverter 44 and the like cooperatively with other management units and control units including the battery management unit 411, by responding to operation inputs by a driver and the like. By the cooperative control by the vehicle ECU 42 and the like, output of electric power from the vehicle power source 41, charge of the vehicle power source 41 and the like are controlled, whereby the entire vehicle 400 can be managed. Between the battery management unit 411 and the vehicle ECU 42, data related to the maintenance of the vehicle power source 41 such as a remaining capacity of the vehicle power source 41 is transferred via the communication line.

The vehicle according to the fifth embodiment is equipped with the battery pack according to the fourth embodiment.

Thus, the vehicle according to the fifth embodiment is superior in travelling performance.

EXAMPLES

Example 1

First, carbon fiber was dispersed in N-methyl-2-pyrrolidone to prepare a carbon fiber-dispersed solution. As the carbon fiber, carbon nanotubes having an average thickness of 0.005 µm and an average length of 50 µm were used. Hereinafter, this carbon fiber will be referred to as CNT1. The carbon fiber-dispersed solution was mixed with inorganic solid particles and a binder, and the mixture was stirred using a planetary mixer to prepare a first slurry. As the inorganic solid particles, $Li_{1+x+y}Al_x(Ti, Ge)_{2-x}Si_yP_{3-y}O_{12}$ (Li—Al—Ti—P—O: $0<x\leq 2$, $0\leq y<3$) having an average particle size of 0.5 µm and a lithium ion conductivity of $1\times 10^{-4}$ S/cm was used. Hereinafter, the inorganic solid particles will be referred to as LATPO1. As the binder, polyvinylidene fluoride was used.

The first slurry was mixed with an active material, granular carbon and the binder, and this mixture was stirred using a planetary mixer and subsequently subjected to a further stirring process using a bead mill to prepare a second slurry. The stirring was conducted at a stirring speed of 1500 rpm for a stirring time of 1 minute. As the active material, particles of a lithium-containing nickel-manganese-cobalt composite oxide ($LiNi_{0.5}Mn_{0.2}Co_{0.3}O_2$) having an average particle size of 6.4 µm were used. Hereinafter, this active material will be referred to as LNMC1. As the granular carbon, acetylene black having an average particle size of 0.2 µm was used. Hereinafter, this granular carbon will be referred to as AB. In the second slurry, the amounts of the inorganic solid particles, the carbon fiber, the granular carbon, and the binder were respectively 3 parts by mass, 0.1 parts by mass, 3 parts by mass, and 2 parts by mass to 100 parts by mass of the active material.

Next, the second slurry was applied to both surfaces of a current collector, and the applied slurry was dried to obtain an active material-containing layer. As the current collector, aluminum alloy foil with a thickness of 12 µm was used. The current collector and the active material-containing layer were subjected to pressing, thereby obtaining an electrode. The density of the active material-containing layer was 3.2 g/cm³.

Example 2

An electrode was prepared in a manner similar to Example 1 except that the kinds of the active material and the inorganic solid particles were changed, the mixing amount of the granular carbon was changed, and the stirring speed of the second slurry was changed. As the active material, particles of a lithium-containing nickel-manganese-cobalt composite oxide ($LiNi_{0.5}Mn_{0.2}Co_{0.3}O_2$) having an average particle size of 25 µm were used. Hereinafter, this active material will be referred to as LNMC2. As the inorganic solid particles, $Li_{1+x+y}Al_x(Ti,Ge)_{2-x}Si_yP_{3-y}O_{12}$ ($0<x\leq 2$, $0\leq y<3$) having an average particle size of 12 µm and a lithium ion conductivity of $1\times 10^{-4}$ S/cm was used. Hereinafter, the inorganic solid particles will be referred to as LATPO2. A stirring speed of the second slurry was 1000 rpm. In the second slurry, the amounts of the inorganic solid particles, the carbon fiber, the granular carbon, and the binder were respectively 3 parts by mass, 0.1 parts by mass, 5 parts by mass, and 2 parts by mass to 100 parts by mass of the active material.

Example 3

An electrode was prepared in a manner similar to Example 1 except that the kind of the inorganic solid particles was changed, the mixing amounts of the inorganic solid particles and the granular carbon were changed, and the stirring speed of the second slurry was changed. As the inorganic solid particles, $Li_{1.2}Zr_{1.9}Ca_{0.1}(PO_4)_3$ having an average particle size of 3 µm and lithium ion conductivity of $5\times 10^{-5}$ S/cm was used. Hereinafter, the inorganic solid particles will be referred to as LZCP1. A stirring speed of the second slurry was 2000 rpm. In the second slurry, the amounts of the inorganic solid particles, the carbon fiber, the granular carbon, and the binder were respectively 5 parts by mass, 0.1 parts by mass, 5 parts by mass, and 2 parts by mass to 100 parts by mass of the active material.

Example 4

An electrode was prepared in a manner similar to Example 1 except that the kinds of the inorganic solid particles and the granular carbon were changed, and the mixing amounts of the carbon fiber, the granular carbon, and the binder were changed. As the inorganic solid particles, LZCP1 was used. As the granular carbon, a mixture of AB and a scale-shaped carbon (SC) was used. A mass ratio of AB to SC in the mixture was 1:1. In the second slurry, the amounts of the inorganic solid particles, the carbon fiber, the granular carbon, and the binder were respectively 3 parts by mass, 1 part by mass, 6 parts by mass, and 1 part by mass to 100 parts by mass of the active material.

Example 5

An electrode was prepared in a manner similar to Example 1 except that the kinds of the active material, the inorganic solid particles and the carbon fiber were changed, and the mixing amounts of the carbon fiber and the binder were changed. As the active material, a lithium-containing nickel-manganese-cobalt composite oxide ($LiNi_{0.3}Mn_{0.3}Co_{0.3}O_2$) having an average particle size of 5 µm was used. Hereinafter, this active material will be referred to as LMNC3. As the inorganic solid particles, $Li_{1+x+y}Al_x(Ti,Ge)_{2-x}Si_yP_{3-y}O_{12}$ ($0<x\leq 2$, $0\leq y<3$) having an average particle size of 1 µm and a lithium ion conductivity of $1\times 10^{-4}$ S/cm was used. Hereinafter, the inorganic solid particles will be referred to as LATPO3. As the carbon fiber, carbon nanotubes having an average thickness of 0.1 µm and an average length of 20 µm were used. Hereinafter, this carbon fiber will be referred to as CNT2. In the second slurry, the amounts of the inorganic solid particles, the carbon fiber, the granular carbon, and the binder were respectively 3 parts by mass, 5 parts by mass, 3 parts by mass, and 3 parts by mass to 100 parts by mass of the active material.

Example 6

An electrode was prepared in a manner similar to Example 1 except that the kinds of the active material, inorganic solid particles, and the carbon fiber were changed, and the mixing amounts of the inorganic solid particles, the carbon fiber, and the binder were changed. As the active material, particles of a lithium-cobalt composite oxide (LiCoO$_2$) having an average particle size of 5 μm were used. Hereinafter, this active material will be referred to as LCO. As the inorganic solid particles, LATPO3 was used. As the carbon fiber, CNT2 was used. In the second slurry, the amounts of the inorganic solid particles, the carbon fiber, the granular carbon, and the binder were respectively 0.5 parts by mass, 5 parts by mass, 3 parts by mass, and 3 parts by mass to 100 parts by mass of the active material.

Example 7

An electrode was prepared in a manner similar to Example 1 except that the kinds of the active material, the inorganic solid particles, and the carbon fiber were changed, and the mixing amounts of the carbon fiber and the binder were changed. As the active material, particles of a lithium-manganese composite oxide (LiMn$_2$O$_4$) having an average particle size of 5 μm were used. Hereinafter, this active material will be referred to as LMO. As the inorganic solid particles, LATPO3 was used. As the carbon fiber, CNT2 was used. In the second slurry, the amounts of the inorganic solid particles, the carbon fiber, the granular carbon, and the binder were respectively 3 parts by mass, 5 parts by mass, 3 parts by mass, and 3 parts by mass to 100 parts by mass of the active material.

Example 8

An electrode was prepared in a manner similar to Example 1 except that the kinds of the active material, the inorganic solid particles and the carbon fiber were changed, and the mixing amounts of the carbon fiber and the binder were changed. As the active material, particles of lithium-nickel-cobalt-aluminum composite oxide (LiNi$_{0.8}$Co$_{0.15}$Al$_{0.05}$O$_2$) having an average particle size of 5 μm were used. Hereinafter, this active material will be referred to as LNCAO. As the inorganic solid particles, LATPO3 was used. As the carbon fiber, CNT2 was used. In the second slurry, the amounts of the inorganic solid particles, the carbon fiber, the granular carbon, and the binder were respectively 3 parts by mass, 5 parts by mass, 3 parts by mass, and 3 parts by mass to 100 parts by mass of the active material.

Example 9

An electrode was prepared in a manner similar to Example 1 except that the kinds of the active material, the inorganic solid particles, and the carbon fiber were changed, and the mixing amounts of the carbon fiber and the binder were changed. As the active material, particles of a lithium-nickel-cobalt-titanium composite oxide (LiNi$_{0.8}$Co$_{0.15}$Ti$_{0.05}$O$_2$) having an average particle size of 5 μm were used. Hereinafter, this active material will be referred to as LNCTO. As the inorganic solid particles, LATPO3 was used. As the carbon fiber, CNT2 was used. In the second slurry, the amounts of the inorganic solid particles, the carbon fiber, the granular carbon, and the binder were respectively 3 parts by mass, 5 parts by mass, 3 parts by mass, and 3 parts by mass to 100 parts by mass of the active material.

Example 10

An electrode was prepared in a manner similar to Example 1 except that the kinds of the active material and the carbon fiber were changed, and the mixing amounts of the inorganic solid particles, the carbon fiber, and the granular carbon were changed. As the active material, particles of a lithium-nickel-manganese-cobalt composite oxide (LiNi$_{0.08}$Mn$_{0.1}$Co$_{0.1}$O$_2$) having an average particle size of 5 μm were used. Hereinafter, this active material will be referred to as LNMC4. As the inorganic solid particles, LATPO1 was used. As the carbon fiber, carbon nanotubes having an average thickness of 0.2 μm and an average length of 30 μm were used. Hereinafter, this carbon fiber will be referred to as CNF. In the second slurry, the amounts of the inorganic solid particles, the carbon fiber, the granular carbon, and the binder were respectively 10 parts by mass, 2 parts by mass, 5 parts by mass, and 2 parts by mass to 100 parts by mass of the active material.

Example 11

An electrode was prepared in a manner similar to Example 1 except that the granular carbon was omitted, the kind of the inorganic solid particles was changed, and the mixing amount of the carbon fiber was changed. As the inorganic solid particles, Li$_7$La$_3$Zr$_2$O$_{12}$ having an average particle size of 0.5 μm and a lithium ion conductivity of $1 \times 10^{-4}$ S/cm was used. Hereinafter, the inorganic solid particles will be referred to as LLZ. In the second slurry, the amounts of the inorganic solid particles, the carbon fiber, the granular carbon, and the binder were respectively 3 parts by mass, 0.5 parts by mass, 0 parts by mass, and 2 parts by mass to 100 parts by mass of the active material.

Comparative Example 1

First, an active material, inorganic solid particles, carbon fiber, granular carbon, a binder, and a solvent were mixed to obtain a mixture. As the active material, LNMCO2 was used. As the inorganic solid particles, LATPO2 was used. As the carbon fiber, CNT1 was used. As the granular carbon, AB was used. As the binder, PVdF was used. As the solvent, N-methyl-2-pyrrolidone was used. The mixture was stirred using a planetary mixer to obtain a slurry. The stirring was conducted at a stirring speed of 1000 rpm for a stirring time of 1 minute. In the slurry, the amounts of the inorganic solid particles, the carbon fiber, the granular carbon, and the binder were respectively 3 parts by mass, 0.05 parts by mass, 5 parts by mass, and 2 parts by mass to 100 parts by mass of the active material. An electrode was prepared in a manner similar to Example 1 except that this slurry was used instead of the second slurry.

Comparative Example 2

An electrode was prepared in a manner similar to Comparative Example 1 except that the kinds of the active material and the inorganic solid particles were changed, the mixing amounts of the carbon fiber and the granular carbon were changed, and the stirring speed of the slurry was changed. As the active material, LNMCO1 was used. As the inorganic solid particles, Li$_{1+x+y}$Al$_x$(Ti,Ge)$_{2+x}$Si$_y$P$_{3-y}$O$_{12}$ (0<x≤2, 0≤y<3) having an average particle size of 0.2 μm and a lithium ion conductivity of $1 \times 10^{-4}$ S/cm was used. Hereinafter, the inorganic solid particles will be referred to as LATPO4. A stirring speed of the slurry was 2000 rpm. In the slurry, the amounts of the inorganic solid particles, the carbon fiber, the granular carbon, and the binder were respectively 3 parts by mass, 0.2 parts by mass, 2 parts by mass, and 2 parts by mass to 100 parts by mass of the active material.

Comparative Example 3

An electrode was prepared in a manner similar to Example 1 except that the inorganic solid particles were omitted, and the mixing amounts of the carbon fiber and the granular carbon were changed. In the second slurry, the amounts of the inorganic solid particles, the carbon fiber, the granular carbon, and the binder were respectively 0 parts by mass, 0.1 parts by mass, 4 parts by mass, and 2 parts by mass to 100 parts by mass of the active material.

Comparative Example 4

First, an active material, inorganic solid particles, granular carbon, a binder, and a solvent were mixed to obtain a mixture. As the active material, LNMC1 was used. As the inorganic solid particles, LATPO1 was used. As the granular carbon, a mixture of AB and CB was used. A mass ratio of AB to CB in the mixture was 1:1. As the binder, PVdF was used. As the solvent, N-methyl-2-pyrrolidone was used. The mixture was stirred using a planetary mixer to obtain a slurry. The stirring was conducted at a stirring speed of 1500 rpm for a stirring time of 1 minute. In the slurry, the amounts of the inorganic solid particles, the carbon fiber, the granular carbon, and the binder were respectively 3 parts by mass, 0 parts by mass, 6 parts by mass, and 1 part by mass to 100 parts by mass of the active material.

An electrode was prepared in a manner similar to Example 1 except that this slurry was used instead of the second slurry.

Comparative Example 5

First, an active material, granular carbon, a binder, and a solvent were mixed to obtain a mixture. As the active material, LNMC1 was used. As the granular carbon, AB was used. As the binder, PVdF was used. As the solvent, N-methyl-2-pyrrolidone was used. The mixture was stirred using a planetary mixer to obtain a slurry. The stirring was conducted at a stirring speed of 1500 rpm for a stirring time of 1 minute. In the slurry, the amounts of the inorganic solid particles, the carbon fiber, the granular carbon, and the binder were respectively 0 parts by mass, 0 parts by mass, 5 parts by mass, and 2 parts by mass to 100 parts by mass of the active material.

An electrode was prepared in a manner similar to Example 1 except that this slurry was used instead of the second slurry.

(Determination of Log Differential Pore Volume Distribution Curve and Calculation of Slope Distribution Curve)

By the method described above, log differential pore volume distribution curves for the electrodes prepared in Examples 1 to 11 and Comparative Examples 1 to 5 were determined. FIG. 13 is a graph showing the log differential pore volume distribution curve for the active material-containing layer of the electrode according to Comparative Example 5. In addition, the slope distribution curve shown in FIG. 14 was obtained based on the log differential pore diameter distribution curve shown in FIG. 13. FIG. 14 is a graph showing an example slope distribution curve for the electrode according to Comparative Example 5.

(Evaluation of Input/Output Performance)

A three-electrode glass cell was produced and input/output performance thereof was evaluated. As a working electrode, each of the electrodes prepared in Examples 1 to 11 and Comparative Examples 1 to 5 was used. The electrodes were in the shape of a square with a side length of 2 cm. As a counter electrode and a reference electrode, lithium metal was used. As an electrolyte, a solution obtained by dissolving lithium hexafluorophosphate ($LiPF_6$) into a mixed solvent of ethylene carbonate and diethyl carbonate was used. The ratio of ethylene carbonate to diethyl carbonate in the mixed solvent was 1:2. The concentration of $LiPF_6$ was 1 mol/L. The amount of the electrolyte was 25 mL.

First, the produced three-electrode glass cell was charged at 25° C. at a current density of 1 C until the state of charge (SOC) reaches 100%. Subsequently, the cell was discharged at a current density of 0.2 C until the SOC becomes 0%, and the discharge capacity W1 was measured. Next, the three-electrode glass cell was charged again at a current density of 1 C until the SOC reaches 100%. Subsequently, the cell was discharged at a current density of 5 C until the SOC becomes 0%, and the discharge capacity W2 was measured. By dividing the discharge capacity W2 by the discharge capacity W1, a capacity ratio W2/W1 was obtained. The results are summarized in Table 4.

TABLE 1

| | Active Material | | Inorganic Solid Particles | | | |
|---|---|---|---|---|---|---|
| | Composition | Average Particle Size (μm) | Composition | Li Ion Conductivity (S/cm) | Average Particle Size (μm) | Mixing Amount (parts by mass) |
| Example 1 | $LiNi_{0.5}Mn_{0.2}Co_{0.3}O_2$ | 6.4 | Li—Al—Ti—P—O | $1 \times 10^{-4}$ | 0.5 | 3 |
| Example 2 | $LiNi_{0.5}Mn_{0.2}Co_{0.3}O_2$ | 25 | Li—Al—Ti—P—O | $1 \times 10^{-4}$ | 12 | 3 |
| Example 3 | $LiNi_{0.5}Mn_{0.2}Co_{0.3}O_2$ | 6.4 | $Li_{1.2}Zr_{1.9}Ca_{0.1}(PO_4)_3$ | $5 \times 10^{-5}$ | 3 | 5 |
| Example 4 | $LiNi_{0.5}Mn_{0.2}Co_{0.3}O_2$ | 6.4 | $Li_{1.2}Zr_{1.9}Ca_{0.1}(PO_4)_3$ | $5 \times 10^{-5}$ | 3 | 3 |
| Example 5 | $LiNi_{0.5}Mn_{0.2}Co_{0.3}O_2$ | 5 | Li—Al—Ti—P—O | $1 \times 10^{-4}$ | 1 | 3 |
| Example 6 | $LiCoO_2$ | 5 | Li—Al—Ti—P—O | $1 \times 10^{-4}$ | 1 | 0.5 |
| Example 7 | $LiMn_2O_4$ | 5 | Li—Al—Ti—P—O | $1 \times 10^{-4}$ | 1 | 3 |
| Example 8 | $LiNi_{0.8}Co_{0.15}Al_{0.05}O_2$ | 5 | Li—Al—Ti—P—O | $1 \times 10^{-4}$ | 1 | 3 |
| Example 9 | $LiNi_{0.8}Co_{0.15}Ti_{0.05}O_2$ | 5 | Li—Al—Ti—P—O | $1 \times 10^{-4}$ | 1 | 3 |
| Example 10 | $LiNi_{0.8}Mn_{0.1}Co_{0.1}O_2$ | 5 | Li—Al—Ti—P—O | $1 \times 10^{-4}$ | 0.5 | 10 |
| Example 11 | $LiNi_{0.5}Mn_{0.2}Co_{0.3}O_2$ | 6.4 | $Li_7La_3Zr_2O_{12}$ | $1 \times 10^{-4}$ | 0.5 | 3 |
| Comparative Example 1 | $LiNi_{0.5}Mn_{0.2}Co_{0.3}O_2$ | 25 | Li—Al—Ti—P—O | $1 \times 10^{-4}$ | 12 | 3 |
| Comparative Example 2 | $LiNi_{0.5}Mn_{0.2}Co_{0.3}O_2$ | 6.4 | Li—Al—Ti—P—O | $1 \times 10^{-4}$ | 0.2 | 3 |

TABLE 1-continued

| | Active Material | | Inorganic Solid Particles | | | |
|---|---|---|---|---|---|---|
| | Composition | Average Particle Size (μm) | Composition | Li Ion Conductivity (S/cm) | Average Particle Size (μm) | Mixing Amount (parts by mass) |
| Comparative Example 3 | $LiNi_{0.5}Mn_{0.2}Co_{0.3}O_2$ | 6.4 | — | — | — | 0 |
| Comparative Example 4 | $LiNi_{0.5}Mn_{0.2}Co_{0.3}O_2$ | 6.4 | Li—Al—Ti—P—O | $1 \times 10^{-4}$ | 0.5 | 3 |
| Comparative Example 5 | $LiNi_{0.5}Mn_{0.2}Co_{0.3}O_2$ | 6.4 | — | — | — | 0 |

Table 1 shows, in the columns labeled "Composition" and "Average Particle Size" under the heading "Active Material", the composition and average particle size of the active material, respectively. In addition, Table 1 shows, in the column labeled "Composition", "Li Ion Conductivity", "Average Particle Size", and "Mixing Amount" under the heading "Inorganic Solid Particles", the composition, lithium ion conductivity, average particle size and mixing amount of the inorganic solid particles to 100 parts by mass of the active material, respectively.

TABLE 2

| | Carbon Fiber | | | | | Granular Carbon | | Binder | |
|---|---|---|---|---|---|---|---|---|---|
| | Kind | Thickness S (μm) | Length L (μm) | L/S | Mixing Amount (parts by mass) | Kind | Mixing Amount (parts by mass) | Kind | Mixing Amount (parts by mass) |
| Example 1 | CNT1 | 0.005 | 50 | 10000 | 0.1 | AB | 3 | PVdF | 2 |
| Example 2 | CNT1 | 0.005 | 50 | 10000 | 0.1 | AB | 5 | PVdF | 2 |
| Example 3 | CNT1 | 0.005 | 50 | 10000 | 0.1 | AB | 5 | PVdF | 2 |
| Example 4 | CNT1 | 0.005 | 50 | 10000 | 1 | AB SC | 6 | PVdF | 1 |
| Example 5 | CNT2 | 0.1 | 20 | 200 | 5 | AB | 3 | PVdF | 3 |
| Example 6 | CNT2 | 0.1 | 20 | 200 | 5 | AB | 3 | PVdF | 3 |
| Example 7 | CNT2 | 0.1 | 20 | 200 | 5 | AB | 3 | PVdF | 3 |
| Example 8 | CNT2 | 0.1 | 20 | 200 | 5 | AB | 3 | PVdF | 3 |
| Example 9 | CNT2 | 0.1 | 20 | 200 | 5 | AB | 3 | PVdF | 3 |
| Example 10 | CNF | 0.2 | 30 | 150 | 2 | AB | 5 | PVdF | 2 |
| Example 11 | CNT1 | 0.005 | 50 | 10000 | 0.5 | — | 0 | PVdF | 2 |
| Comparative Example 1 | CNT1 | 0.005 | 50 | 10000 | 0.05 | AB | 5 | PVdF | 2 |
| Comparative Example 2 | CNT1 | 0.005 | 50 | 10000 | 0.2 | AB | 2 | PVdF | 2 |
| Comparative Example 3 | CNT1 | 0.005 | 50 | 10000 | 0.1 | AB | 4 | PVdF | 2 |
| Comparative Example 4 | — | — | — | — | 0 | AB SC | 6 | PVdF | 1 |
| Comparative Example 5 | — | — | — | — | 0 | AB | 5 | PVdF | 2 |

Table 2 shows, in the columns labeled "Kind", "Thickness S", "Length L", "L/S", and "Mixing Amount" under the heading "Carbon Fiber", the kind, average thickness S, average length L, ratio of the average thickness S to the average length L, and the mixing amount of the carbon fiber to 100 parts by mass of the active material, respectively. In addition, Table 2 shows, in the column labeled "Kind" and "Mixing Amount" under the heading "Granular Carbon", the kind and mixing amount of the granular carbon to 100 parts by mass of the active material, respectively. In addition, Table 2 shows, in the column labeled "Kind" and "Mixing Amount" under the heading "Binder", the kind and mixing amount of the binder relative to 100 parts by mass of the active material.

TABLE 3

| | | Stirring Condition | |
|---|---|---|---|
| | Carbon Fiber Mixed Slurry | Stirring Speed (rpm) | Stirring Time (min) |
| Example 1 | First slurry | 1500 | 1 |
| Example 2 | First slurry | 1000 | 1 |
| Example 3 | First slurry | 2000 | 1 |

TABLE 3-continued

| | | Stirring Condition | |
|---|---|---|---|
| | Carbon Fiber Mixed Slurry | Stirring Speed (rpm) | Stirring Time (min) |
| Example 4 | First slurry | 1500 | 1 |
| Example 5 | First slurry | 1500 | 1 |
| Example 6 | First slurry | 1500 | 1 |
| Example 7 | First slurry | 1500 | 1 |
| Example 8 | First slurry | 1500 | 1 |
| Example 9 | First slurry | 1500 | 1 |
| Example 10 | First slurry | 1500 | 1 |
| Example 11 | First slurry | 1500 | 1 |

TABLE 3-continued

| | | Stirring Condition | |
| | Carbon Fiber Mixed Slurry | Stirring Speed (rpm) | Stirring Time (min) |
|---|---|---|---|
| Comparative Example 1 | Slurry | 1000 | 1 |
| Comparative Example 2 | Slurry | 2000 | 1 |
| Comparative Example 3 | First slurry | 1500 | 1 |
| Comparative Example 4 | — | 1500 | 1 |
| Comparative Example 5 | — | 1500 | 1 |

Table 3 shows, in the column labeled "Carbon Fiber Mixed Slurry", the slurry into which the carbon fiber was mixed. In addition, Table 3 shows, in the column labeled "Stirring Speed" and "Stirring Time" under the heading "Stirring Condition", the stirring speed and stirring time of the second slurry or slurries, respectively.

TABLE 4

| | Electrode | | | | | | | |
|---|---|---|---|---|---|---|---|---|
| | Density (g/cm³) | $D_M$ (μm) | SA | SAD (μm) | SB | SBD (μm) | SA – SB | Total Pore Volume (mL/g) | Battery W2/W1 |
| Example 1 | 3.20 | 0.20 | 1.68 | 0.032 | 0.105 | 0.069 | 1.58 | 0.063 | 0.69 |
| Example 2 | 3.30 | 10.00 | 1.54 | 0.072 | 0.018 | 1.200 | 1.52 | 0.075 | 0.65 |
| Example 3 | 3.45 | 0.05 | 1.70 | 0.029 | 0.104 | 0.045 | 1.60 | 0.054 | 0.70 |
| Example 4 | 3.20 | 0.17 | 1.90 | 0.032 | 0.045 | 0.070 | 1.85 | 0.055 | 0.75 |
| Example 5 | 3.20 | 0.20 | 1.57 | 0.035 | 0.072 | 0.069 | 1.50 | 0.063 | 0.65 |
| Example 6 | 3.20 | 0.19 | 1.58 | 0.035 | 0.070 | 0.069 | 1.51 | 0.063 | 0.59 |
| Example 7 | 3.20 | 0.22 | 1.61 | 0.032 | 0.072 | 0.073 | 1.54 | 0.066 | 0.65 |
| Example 8 | 3.20 | 0.25 | 1.70 | 0.036 | 0.075 | 0.073 | 1.63 | 0.068 | 0.64 |
| Example 9 | 3.20 | 0.27 | 1.65 | 0.035 | 0.072 | 0.073 | 1.58 | 0.070 | 0.67 |
| Example 10 | 3.40 | 0.15 | 1.60 | 0.032 | 0.051 | 0.071 | 1.55 | 0.054 | 0.72 |
| Example 11 | 3.20 | 0.14 | 1.58 | 0.030 | 0.049 | 0.065 | 1.53 | 0.072 | 0.60 |
| Comparative Example 1 | 3.05 | 12.00 | 1.23 | 5.200 | 0.860 | 8.400 | 0.37 | 0.085 | 0.55 |
| Comparative Example 2 | 3.60 | 0.05 | 1.48 | 0.015 | 0.400 | 0.041 | 1.08 | 0.048 | 0.52 |
| Comparative Example 3 | 3.30 | 0.12 | 1.52 | 0.031 | 0.470 | 0.068 | 1.05 | 0.047 | 0.50 |
| Comparative Example 4 | 3.50 | 0.10 | 1.62 | 0.032 | 0.360 | 0.069 | 1.26 | 0.049 | 0.50 |
| Comparative Example 5 | 3.60 | 0.12 | 1.22 | 0.027 | 0.520 | 0.075 | 0.70 | 0.050 | 0.48 |

Table 4 summarizes, in the columns labeled "Density", "$D_M$", "SA", "SAD", "SB" "SBD", "SA–SB", and "Total Pore Volume" under the heading "Electrode", the densities of the electrodes, pore diameters $D_M$ at the first peaks obtained by mercury porosimetry, maximum slope values SA, pore diameters SAD at maximum slope values SA, minimum slope values SB, pore diameters SBD at minimum slope values SB, values SA–SB obtained by subtracting minimum slope values SB from maximum slope values SA, and the total pore volumes of the active material-containing layers, respectively. In addition, Table 4 summarizes, in the column labeled "W2/W1" under the heading "Battery", ratios of capacities W2 obtained in discharging at a current density of 0.2 C to capacities W1 obtained in discharging at a current density of 5 C.

As is apparent from the comparison between Examples 1 to 11 and Comparative Examples 1 to 5, the electrodes having a pore diameter $D_M$ at the first peak ranging from 0.05 μm to 10 μm, and having a value SA–SB of 1.4 or more, achieved a more excellent input/output performance compared to the electrodes that fail to satisfy either of these conditions.

In addition, as shown in Examples 1 and 5 to 10, even though the kind of the active material was changed, excellent input/output performance was achieved. Further, as shown in Examples 1, 3, 4 and 11, even though the kind of the inorganic solid particles was changed, excellent input/output performance was achieved. Moreover, as shown in Examples 1 and 10, even though the kind of the carbon fiber was changed, excellent input/output performance was achieved.

The electrode according to at least one of the embodiments described above includes an active material-containing layer that includes active material including a lithium-containing transition metal composite oxide, inorganic solid particles having lithium ion conductivity, and carbon fiber, in which a pore diameter $D_M$ at the first peak in the log differential pore volume distribution curve according to mercury porosimetry of the active material-containing layer is 0.05 μm to 10 μm, and a value SA–SB in the slope distribution curve is 1.4 or more. Using this electrode, a secondary battery excellent in input/output performance can be attained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode, comprising:
   an active material-containing layer including: an active material including a lithium-containing transition metal composite oxide; inorganic solid particles having lithium ion conductivity; and carbon fiber, wherein the active material-containing layer has a first peak indicating a maximum log differential pore volume in a log differential pore volume distribution curve according to mercury porosimetry, and a pore diameter $D_M$ at the first peak is 0.05 μm to 10 μm, a value SA−SB is 1.4 or more in a slope distribution curve of the active material-containing layer, where a vertical axis of the slope distribution curve represents a slope of a straight line passing through two adjacent measurement points on the log differential pore volume distribution curve and a horizontal axis of the slope distribution curve represents a smaller pore diameter of the two adjacent measurement points, and the value SA−SB is obtained by subtracting, from a maximum slope value SA in a range of pore diameters smaller than the pore diameter $D_M$ at the first peak, a minimum slope value SB in a range of pore diameters smaller than the pore diameter $D_M$ at the first peak and greater than the pore diameter at the maximum slope value SA.

2. The electrode according to claim 1, wherein the pore diameter $D_M$ at the first peak is 0.10 μm to 0.50 μm.

3. The electrode according to claim 1, wherein the value SA−SB is 1.5 to 2.0.

4. The electrode according to claim 1, wherein the active material-containing layer has a total pore volume of 0.05 mL/g to 0.10 mL/g according to the mercury porosimetry.

5. The electrode according to claim 1, wherein the lithium-containing transition metal composite oxide is represented by $Li_{1-x}Ni_{1-a-b}Co_aMn_bA_cO_2$, Where A is at least one element selected from the group consisting of Al, Ti, Zr, Nb, Mg, Cr, V, Fe, Ta, Mo, Zn, Ca, Sn, Si, and P, x is 0 to 1, a is 0 to 1, b is 0 to 1, a sum of a and b is 1 or less, and c is 0 to 1.

6. The electrode according to claim 1, wherein the inorganic solid particles include solid electrolyte particles having a lithium ion conductivity of $1 \times 10^{-5}$ S/cm or more at 25° C.

7. The electrode according to claim 1, wherein the inorganic solid particles comprise at least one compound selected from a group consisting of: a metal oxide including at least one element selected from a group consisting of Ti, Ge, Sr, ZrSn, Al, Sc, Y, Ba, P, and Ca; a lanthanide oxide; and a sulfide including at least one element selected from a group consisting of Li, Ge, P, Si, Sn, Al, Ga, B, and In.

8. The electrode according to claim 1, wherein the carbon fiber has an average diameter of a cross section perpendicular to a longitudinal direction of the carbon fiber of 1 nm to 200 nm.

9. The electrode according to claim 1, wherein the carbon fiber has an average length of 5 μm to 50 μm.

10. A secondary battery, comprising: a positive electrode; a negative electrode; and an electrolyte,
wherein at least one of the positive electrode and the negative electrode is the electrode according to claim 1,
wherein the electrolyte is one of a liquid nonaqueous electrolyte and a gel nonaqueous electrolyte.

11. The secondary battery according to claim 10, wherein the negative electrode comprises titanium-containing composite oxide including at least one compound represented by a general formula selected from a group consisting of $A_xTiM_yNb_{2-y}O_{7\pm z}$ where 0≤x≤5, 0≤y≤0.5, −0.3≤z≤0.3, M is at least one metal element other than Ti and Nb, A is at least one of Li and Na, $Li_{2+a}Na_2Ti_6O_{14}$ where 0≤a≤6, and $Li_xTiO_2$ where 0≤x≤1.

12. A battery pack comprising the secondary battery according to claim 10.

13. The battery pack according to claim 12, further comprising:
an external power distribution terminal; and
a protective circuit.

14. The battery pack according to claim 12, which includes plural of the secondary battery, wherein the plural of the secondary battery are electrically connected in series, in parallel, or in combination of series and parallel.

15. A vehicle comprising the battery pack according to claim 12.

16. The vehicle according to claim 15, which comprises a mechanism configured to convert kinetic energy of the vehicle into regenerative energy.

17. The electrode according to claim 4, wherein the active material-containing layer has a total pore volume of 0.06 mL/g to 0.08 mL/g according to the mercury porosimetry.

* * * * *